US008228427B2

(12) United States Patent
Mori et al.

(10) Patent No.: US 8,228,427 B2
(45) Date of Patent: Jul. 24, 2012

(54) IMAGE DISPLAYING DEVICE AND METHOD FOR PREVENTING IMAGE QUALITY DETERIORATION

(75) Inventors: Takeshi Mori, Kameyama (JP); Seiji Kohashikawa, Suzuka (JP); Hiroyuki Furukawa, Iga (JP); Masafumi Ueno, Ikoma (JP); Kenichiroh Yamamoto, Chiba (JP); Takashi Yoshii, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 618 days.

(21) Appl. No.: 12/441,491

(22) PCT Filed: Apr. 6, 2007

(86) PCT No.: PCT/JP2007/057758
§ 371 (c)(1),
(2), (4) Date: Mar. 16, 2009

(87) PCT Pub. No.: WO2008/035474
PCT Pub. Date: Mar. 27, 2008

(65) Prior Publication Data
US 2009/0268089 A1 Oct. 29, 2009

(30) Foreign Application Priority Data

Sep. 20, 2006 (JP) ................. 2006-253893

(51) Int. Cl.
*H04N 7/01* (2006.01)
(52) U.S. Cl. ...................................... 348/441
(58) Field of Classification Search .......... 348/441, 348/448, 452, 458, 459, 451, 699–701; 375/240, 375/14, 240.1, 240.2, 240.16
See application file for complete search history.

(56) References Cited

U.S. PATENT DOCUMENTS
5,353,344 A * 10/1994 Knitsch ................. 379/386
(Continued)

FOREIGN PATENT DOCUMENTS
CN 1496114 A 5/2004
(Continued)

OTHER PUBLICATIONS

Tatsuro Yamauchi, "TV Standards Conversion", Journal of the Institute of Television Engineers of Japan, 1991, vol. 45, No. 12, pp. 1534-1543.

(Continued)

*Primary Examiner* — Paulos Natnael
(74) *Attorney, Agent, or Firm* — Birch, Stewart, Kolasch & Birch, LLP

(57) ABSTRACT

It is an object to prevent the image quality deterioration of a moving image likely to include a plurality of the same consecutive images such as a movie video image or a CG video image due to the motion-compensated frame rate conversion (FRC) processing. An image displaying device is provided with an FRC portion (10) for converting the number of frames in an input image signal by interpolating an image signal to which a motion compensation processing has been given between the frames in the input image signal, a controlling portion (14) for controlling each portion according to an image tone mode selected by a user. The FRC portion (10) includes a motion vector detecting portion (11*e*) for detecting a motion vector between the frames of the input image signal, an interpolating vector evaluating portion (11*f*) for allocating an interpolating vector between the frames based on the motion vector information, and an interpolating frame generating portion (12*d*) for generating an interpolating frame from the interpolating vector. In the case that the image tone mode selected by the user is a predetermined image tone mode, the controlling portion (14) set the motion vector detected by the motion vector detecting portion (11*e*) to zero-vector to make the motion compensation processing of the FRC portion (10) ineffective.

27 Claims, 21 Drawing Sheets

U.S. PATENT DOCUMENTS

| | | | |
|---|---|---|---|
| 5,365,280 A | 11/1994 | De Haan et al. | |
| 6,188,434 B1* | 2/2001 | Tsuchiya | 348/347 |
| 6,782,095 B1* | 8/2004 | Leong et al. | 379/386 |
| 7,440,032 B2* | 10/2008 | Salzer et al. | 348/452 |
| 2004/0085480 A1 | 5/2004 | Salzer et al. | |
| 2004/0160577 A1 | 8/2004 | Baba et al. | |
| 2005/0243216 A1* | 11/2005 | Salzer et al. | 348/701 |
| 2005/0243933 A1* | 11/2005 | Landsiedel et al. | 375/240.16 |
| 2007/0242748 A1* | 10/2007 | Mahadevan et al. | 375/240.14 |
| 2010/0110300 A1* | 5/2010 | Ueno et al. | 348/625 |

FOREIGN PATENT DOCUMENTS

| | | |
|---|---|---|
| EP | 1 551 181 A2 | 7/2005 |
| EP | 1 592 247 A1 | 11/2005 |
| EP | 1 592 249 A1 | 11/2005 |
| JP | 4-302289 A | 10/1992 |
| JP | 6-98256 A | 4/1994 |
| JP | 2004-120757 A | 4/2004 |
| JP | 2005-167887 A | 6/2005 |
| JP | 2005-318612 A | 11/2005 |
| JP | 2005-318622 A | 11/2005 |
| WO | WO 02/102058 A1 | 12/2002 |
| WO | WO 03/100722 A1 | 12/2003 |

OTHER PUBLICATIONS

Ishiguro et al., "Consideration on Motion Picture Quality of the Hold Type Display with an octuple-rate CRT" IEICE Technical Report, Institute of Electronics, Information and Communication Engineers, EID96-4 (Jun. 1996), pp. 19-26.

European Search Report for corresponding EP application No. 11 00 9690, dated Mar. 13, 2012.

Supplementary Partial European Search Report for corresponding EP application No. 07 74 1194, dated Mar. 13, 2012.

* cited by examiner

IMAGE DISPLAYING DEVICE AND METHOD FOR PREVENTING IMAGE QUALITY DETERIORATION

TECHNICAL FIELD

The present invention relates to an image displaying device and method having a function of converting a frame rate or field rate, and more particularly, to an image displaying device and an image displaying method of the device, which include preventing the image quality deterioration of a moving image likely to include a plurality of the same consecutive images due to a motion-compensated rate conversion processing.

BACKGROUND OF THE INVENTION

As compared to conventional cathode-ray tubes (CRTs) primarily used for realizing moving images, LCDs (Liquid Crystal Displays) have a drawback, so-called motion blur, which is the blurring of outline of a moving portion perceived by a viewer when displaying a moving image. It is pointed out that this motion blur arises from the LCD display mode itself (see, e.g., Specification of Japanese Patent No. 3295437; "Ishiguro Hidekazu and Kurita Taiichiro, "Consideration on Motion Picture Quality of the Hold Type Display with an octuple-rate CRT", IEICE Technical Report, Institute of Electronics, Information and Communication Engineers, EID96-4 (1996-06), p. 19-26").

Since fluorescent material is scanned by an electron beam to cause emission of light for display in CRTs, the light emission of pixels is basically impulse-like although slight afterglow of the fluorescent material exists. This is called an impulse display mode. On the other hand, in the case of LCDs, an electric charge is accumulated by applying an electric field to liquid crystal and is retained at a relatively high rate until the next time the electric field is applied. Especially, in the case of the TFT mode, since a TFT switch is provided for each dot composing a pixel and each pixel normally has an auxiliary capacity, the ability to retain the accumulated charge is extremely high. Therefore, the light emission is continued until the pixels are rewritten by the application of the electric field based on the image information of the next frame or field (hereinafter, represented by the frame). This is called a hold display mode.

Since the impulse response of the image displaying light has a temporal spread in the above hold display mode, spatial frequency characteristics deteriorate along with temporal frequency characteristics, resulting in the motion blur. Since the human eye can smoothly follow a moving object, if the light emission time is long as in the case of the hold type, the movement of image seems jerky and unnatural due to the time integration effect.

To improve the motion blur in the above hold display mode, a frame rate (number of frames) is converted by interpolating an image between frames in a known technology. This technology is called FRC (Frame Rate Converter) and is put to practical use in liquid crystal displaying devices, etc.

Conventionally known methods of converting the frame rate include various techniques such as simply repeating readout of the same frame for a plurality of times and frame interpolation using linear interpolation between frames (see, e.g., Yamauchi Tatsuro, "TV Standards Conversion", Journal of the Institute of Television Engineers of Japan, Vol. 45, No. 12, pp. 1534-1543 (1991)). However, in the case of the frame interpolation processing using the linear interpolation, unnaturalness of motion (jerkiness, judder) is generated due to the frame rate conversion, and the motion blur disturbance due to the above hold display mode cannot sufficiently be improved, resulting in inadequate image quality.

To eliminate effects of the jerkiness, etc., and improve quality of moving images, a motion-compensated frame interpolation processing using motion vectors is proposed. Since a moving image itself is captured to compensate the image movement in this processing, highly natural moving images may be acquired without deteriorating the resolution and generating the jerkiness. Since interpolation image signals are generated with motion compensation, the motion blur disturbance due to the above hold display mode may sufficiently be improved.

Above Specification of Japanese Patent No. 3295437 discloses a technology of motion-adaptively generating interpolating frames to increase a frame frequency of a display image for improving deterioration of spatial frequency characteristics causing the motion blur. In this case, at least one interpolation image signal interpolated between frames of a display image is motion-adaptively generated from the previous and subsequent frames, and the generated interpolation image signals are interpolated between the frames and are sequentially displayed.

FIG. 1 is a block diagram of a schematic configuration of an FRC drive display circuit in a conventional liquid crystal displaying device and, in FIG. 1, the FRC drive display circuit includes an FRC portion 100 that converts the number of frames of the input image signal by interpolating the image signals to which the motion compensation processing has been given between frames of the input video signal, an active-matrix liquid crystal display panel 104 having a liquid crystal layer and an electrode for applying the scan signal and the data signal to the liquid crystal layer, and an electrode driving portion 103 for driving a scan electrode and a data electrode of the liquid crystal display panel 104 based on the image signal subjected to the frame rate conversion by the FRC portion 100.

The FRC portion 100 includes a motion vector detecting portion 101 that detects motion vector information from the input image signal and an interpolating frame generating portion 102 that generates interpolating frames based on the motion vector information acquired by the motion vector detecting portion 101.

In the above configuration, for example, the motion vector detecting portion 101 may obtain the motion vector information with the use of a block matching method and a gradient method described later or if the motion vector information is included in the input image signal in some form, this information may be utilized. For example, the image data compression-encoded with the use of the MPEG format includes motion vector information of a moving image calculated at the time of encoding, and this motion vector information may be acquired.

FIG. 2 is a diagram for explaining a frame rate conversion processing by the conventional FRC drive display circuit shown in FIG. 1. The FRC portion 100 generates interpolating frames (gray-colored images in FIG. 2) between frames with the motion compensation using the motion vector information output from the motion vector detecting portion 101 and sequentially outputs the generated interpolation signals along with the input frame signals to perform processing of converting the frame rate of the input image signal from 60 frames per second (60 Hz) to 120 frames per second (120 Hz).

FIG. 3 is a diagram for explaining an interpolating frame generation processing of the motion vector detecting portion 101 and the interpolating frame generating portion 102. The motion vector detecting portion 101 uses the gradient method to detect a motion vector 105 from, for example, a frame #1 and a frame #2 shown in FIG. 3. The motion vector detecting portion 101 obtains the motion vector 105 by measuring a direction and an amount of movement in 1/60 second between the frame #1 and the frame #2. The interpolating frame generating portion 102 then uses the obtained motion vector 105 to allocate an interpolating vector 106 between the frame #1 and the frame #2. An interpolating frame 107 is generated by moving an object (in this case, an automobile) from a position of the frame #1 to a position after 1/120 second based on the interpolating vector 106.

By performing the motion-compensated frame interpolation processing with the use of the motion vector information to increase a display frame frequency in this way, the display state of the LCD (the hold display mode) can be made closer to the display state of the CRT (the impulse display mode) and the image quality deterioration can be improved which is due to the motion blur generated when displaying a moving image.

In the motion-compensated frame interpolation processing, it is essential to detect the motion vectors for performing the motion compensation. For example, the block matching method and the gradient method are proposed as representative techniques for the motion vector detection. In these methods, the motion vector is detected for each pixel or small block between two consecutive frames and this motion vector is used to interpolate each pixel or small block of the interpolating frame between two frames. An image at an arbitrary position between two frames is interpolated at an accurately compensated position to convert the number of frames.

Since the frames are highly correlated in moving images and has continuity in the time axis direction, a pixel or a small block moving in one frame tends to move with the same movement amount in the subsequent frame or the previous frame. For example, in the case of a moving image of a ball rolling from the right to the left of a screen, the ball area moves with similar movement amounts in every frame. Consecutive frames tend to have the continuity of motion vectors.

Therefore, the motion vector in the next frame may more easily or more accurately be detected by reference to a motion vector detection result of preceding frames. For example, in the iterative gradient method, which is an improved gradient method, a motion vector of a neighboring block already detected in the previous frame or the current frame is defined as an initial deflection vector, which is used as a starting point to repeat calculations of the gradient method for a detected block. With this method, a substantially accurate movement amount can be acquired by repeating the gradient method about two times.

A motion vector may also efficiently be detected in the block matching method in such a way that a reference is made to the motion vector detection result of the previous frame to change the search order. When detecting a motion vector, for example, the frame rate conversion may be processed in real time by utilizing the motion vector already detected.

DISCLOSURE OF THE INVENTION

Problems to be Solved by the Invention

Video signals may be sourced from videos from movie films and videos from computer graphics (CG) in addition to videos shot by normal television video cameras. Therefore, television broadcast signals and video disc reproduction signals in the NTSC mode or the PAL mode often include video signals from movie films or CG. Due to the recent development in storage capacity of recording medium (e.g., DVD (digital versatile disc), HD (hard disc)) and the digitization of transmission methods, video signals from various sources may be mixed.

For example, a normal movie film has 24 frames per second and, when this film is output to a display having a frame rate of 60 Hz, the video having a frame rate of 24 Hz is to which the 2-3 pull-down processing has been given and is converted into and output as video signals having a frame rate of 60 Hz by outputting the same images for every two or three frames.

When a filmed movie having 30 frames per second, or animation or a game video image that is produced using CG is output on a display whose frame rate is 60 Hz, the video image whose frame rate is 30 Hz is 2-2-pull-down-processed and the same image is output for every two frames and, thereby, the video image is converted into and output as a video image signal whose frame rate is 60 Hz. When a filmed movie having 24 frames per second is output on a display whose frame rate is 50 Hz, the video image whose frame rage is 24 Hz is 2-2-pull-down-processed and the same image is output for every two frames.

As above, the original images of many filmed movies, many pieces of animation, and many game video images that are produced using CG, have a frame rate of 60 Hz or lower and they are output to display as a video image signal at 60 Hz by consecutively outputting a plurality of same images.

The case of a film movie having 24 frames per second described above will be described with reference to FIG. 4. Frame #1 to #10 of FIG. 4 represents an image sequence converted into 60 Hz from a 24-Hz movie video through the 2-3 pull-down processing. The frames #1 and #2, the frames #3 to #5, the frames #6 and #7, and the frames #8 to #10 are the same images, respectively.

In a video likely to include a plurality of the same output images, the continuity of motion vectors becomes impaired between frames. For example, it is assumed that some kind of a moving object is shot in the video of FIG. 4. Although a motion vector is detected between the frames #5 and #6 since these frames are different images, a motion vector to be detected should completely be zero between the next frames 1#6 and #7 since these frames are the same images. Since the next frames #7 and #8 are different images, a motion vector is detected between these frames.

With regard to the motion vectors of the successive frames from the frame #5 to the frame #7 of FIG. 4, no continuity of the motion vectors exists between adjacent frames since "motion vector exists", "motion vector is zero", and "motion vector exists" are mixed in this order.

If the processing for detecting the motion vector in the next frame is executed by referring to the motion vector detection result of the previous frame as above for such a video likely to include a plurality of the same output images, it is problematic that the motion vector is erroneously detected since no continuity of the motion vector exists between the frames.

In the above example, although a motion vector to be detected should completely be zero between the frames #6 and #7 since these frames are the same images, a motion vector between the previous frames #5 and #6 is not zero and, therefore, a vector other than zero may erroneously be detected by referring to this vector.

Although a motion vector should be detected between the frames #7 and #8 since these frames are different images, a motion vector between the previous frames #6 and #7 is zero and, therefore, a zero vector may erroneously be detected by referring to this vector. It is problematic that such an erroneous detection of the motion vector may cause the image quality deterioration in the displayed video.

In the above type of image displaying device, a plurality of image tones that a user is able to select are usually equipped to designate and adjust the image quality of a displayed image corresponding to the viewing environment and the video image software. For example, a "standard mode" that sets a standard image that is definite, a "dynamic mode" that adjusts an image to be clear and to have strong contrast, a "movie (cinema/theater) mode" that adjusts a dark image to be a viewable image by weakening the sense of contrast for video images such as a movie, and a "game mode" that adjusts an image of a video game, etc., to be an eye-friendly image by suppressing the luminance are generally set.

Adjustment values for the luminance, the gray scale, the black level, the color thickness, the hue, the contour emphasis etc., of a screen are stored in advance corresponding to each of the above image tone modes and, thereby, the user selects a desired image tone mode. Thereby, easy and quick execution of an appropriate image quality adjustment corresponding to the viewing environment and the video image software is enabled. For example, when a movie program or movie software is viewed, the user is able to execute the image quality adjustment suitable for viewing a movie by selecting the "movie (cinema/theater) mode".

Therefore, in the case where an image tone mode such as the "movie (cinema/theater) mode" or the "game mode" is selected by the user, since a moving image that may include sections having the plurality of consecutive same images such as a movie video image or a CG video image is input, it is highly probable that degradation of the image quality of the display video image is caused by the above reason.

The present invention was conceived in view of the above problems and it is therefore the object of the present invention to provide an image displaying device and method capable of preventing the image quality deterioration of a moving image likely to include a plurality of the same consecutive images such as a movie video and a game (CG) video due to the motion-compensated frame rate conversion (FRC) processing.

Means for Solving the Problems

A first invention of the present application is an image displaying device having a rate converting portion that converts the number of frames or fields of an input image signal by interpolating an interpolation image signal between frames or fields of the input image signal, wherein a mode setting portion for a user to select and set an image tone mode to set and adjust the image quality of a display image from a plurality of image tone modes prepared in advance, wherein the rate converting portion comprises an interpolation image generating portion that generates an interpolation image signal by giving the motion compensation processing to the input image signal based on motion vector information between the frames or fields of the input image signal, and the interpolation of the image signal generated by giving the motion compensation processing is not executed when the image tone mode set by the mode setting portion is a predetermined image tone mode set in advance as an image tone mode suitable for displaying a video image including a moving image likely to include the same consecutive images in a plurality of frames or fields.

A second invention of the present application is the image displaying device, wherein the rate converting portion interpolates an image signal generated by making the motion compensation processing in the interpolation image generating portion ineffective between the frames or fields of the input image signal when the image tone mode set by the mode setting portion is the predetermined image tone mode.

A third invention of the present application is the image displaying device, wherein the interpolation image generating portion comprises: a motion vector detecting portion that detects the motion vector information between consecutive frames or fields included in the input image signal; and an interpolating vector allocating portion that allocates an interpolating vector between the frames or fields based on the detected motion vector information.

A fourth invention of the present application is the image displaying device, wherein the interpolation image generating portion makes the motion compensation processing ineffective by setting the motion vector detected by the motion vector detecting portion to zero-vector when the image tone mode set by the mode setting portion is the predetermined image tone mode.

A fifth invention of the present application is the image displaying device, wherein the interpolation image generating portion makes the motion compensation processing ineffective by setting the interpolating vector allocated by the interpolating vector allocating portion to zero-vector when the image tone mode set by the mode setting portion is the predetermined image tone mode.

A sixth invention of the present application is the image displaying device, which does not insert the interpolation image signal generated by giving the motion compensation processing between the frames or fields of the input image signal and does not convert the number of frames or fields of the input image signal when the image tone mode set by the mode setting portion is the predetermined image tone mode.

A seventh invention of the present application is the image displaying device, wherein a driving frequency of a display panel displaying the image signal is variable, and the image displaying device comprises a portion for varying the driving frequency of the display panel from the frame frequency or the field frequency converted by the rate converting portion to the frame frequency or the field frequency of the input image signal when the image tone mode set by the mode setting portion is the predetermined image tone mode.

An eighth invention of the present application is the image displaying device, wherein the rate converting portion converts the number of frames or fields of the input image signal by inserting an image signal to which the motion compensation processing has not been given between the frames or fields of the input image signal when the image tone mode set by the mode setting portion is the predetermined image tone mode.

A ninth invention of the present application is the image displaying device, wherein the rate converting portion converts the number of frames or fields of the input image signal by inserting an image signal of the frames or fields between frames or fields of the input image signal when the image tone mode set by the mode setting portion is the predetermined image tone mode.

A tenth invention of the present application is the image displaying device, wherein the rate converting portion converts the number of frames or fields of the input image signal by interpolating an image signal formed by giving a linear interpolation processing to an image signal of the frames or fields between frames or fields of the input image signal when the image tone mode set by the mode setting portion is the predetermined image tone mode.

An eleventh invention of the present application is the image displaying device, wherein the rate converting portion converts the number of frames or fields of the input image signal by inserting a predetermined monochromatic image signal between frames or fields of the input image signal when the image tone mode set by the mode setting portion is the predetermined image tone mode.

A twelfth invention of the present application is the image displaying device, wherein the predetermined image tone mode is movie mode.

A thirteenth invention of the present application is the image displaying device, wherein the predetermined image tone mode is game mode.

A fourteenth invention of the present application is an image displaying device, wherein the rate converting portion converts a frame frequency or field frequency of the input image signal into integral multiples of each.

A fifteenth invention of the present application is an image displaying method having a rate converting process for converting the number of frames or fields of an input image signal by interpolating an interpolation image signal between frames or fields of the input image signal, wherein the process in which a user is caused to select and set an image tone mode to set and adjust the image quality of a display image from a plurality of image tone modes prepared in advance is included, and the rate converting process has an interpolation image generating process for generating an interpolation image signal by giving the motion compensation processing to the input image signal based on motion vector information between frames or fields of the input image signal, and the interpolation of the image signal generated by giving the motion compensation processing is not executed when the image tone mode set by the user is a predetermined image tone mode set in advance as an image tone mode suitable for displaying a video image including a moving image likely to include the same consecutive images in a plurality of frames or fields.

A sixteenth invention of the present application is the image displaying method, wherein in the rate converting process, the image signal generated by making the motion compensation processing in the interpolation image generating portion ineffective is interpolated between the frames or fields of the input image signal when the image tone mode set by the mode setting portion is the predetermined image tone mode.

A seventeenth invention of the present application is the image displaying method, wherein the interpolation image signal generated by giving the motion compensation processing is not inserted between the frames or fields of the input image signal and the number of frames or fields of the input image signal is not converted when the image tone mode set by the user is the predetermined image tone mode.

An eighteenth invention of the present application is the image displaying method, wherein in the rate converting process, the number of frames or fields of the input image signal is converted by inserting an image signal of the frames or fields between frames or fields of the input image signal when the image tone mode set by the user is the predetermined image tone mode.

A nineteenth invention of the present application is the image displaying method, wherein in the rate converting process, the number of frames or fields of the input image signal is converted by interpolating an image signal formed by giving a linear interpolation processing to the image signal of the frames or fields between frames or fields of the input image signal when the image tone mode set by the user is the predetermined image tone mode.

A twentieth invention of the present application is the image displaying method, wherein in the rate converting process, the number of frames or fields of the input image signal is converted by inserting a predetermined monochromatic image signal between the frames or fields of the input image signal when the image tone mode set by the user is the predetermined image tone mode.

A twenty-first invention of the present application is an image displaying device having a rate converting portion that converts the number of frames or fields of an input image signal by interpolating an interpolation image signal between frames or fields of the input image signal, wherein a mode setting portion for a user to select and set an image tone mode to set and adjust the image quality of a display image from a plurality of image tone modes prepared in advance, wherein the rate converting portion comprises an interpolation image generating portion that generates an interpolation image signal by giving the motion compensation processing to the input image signal based on motion vector information between the frames or fields of the input image signal, and interpolates an interpolation image signal generated by reducing the strength of the compensation of the motion compensation processing between frames or fields of the input image signal when the image tone mode set by the mode setting portion is a predetermined image tone mode suitable for displaying a video image including a moving image likely to include the same consecutive images in a plurality of frames or fields.

A twenty-second invention of the present application is the image displaying device, wherein the interpolation image generating portion generates an interpolation image signal by performing weighted addition of the image signal to which the motion compensation processing has been given and an image signal to which the motion compensation processing has not been given at a predetermined rate, and the rate of the weighted addition is varied when the genre determined by the determining portion is the predetermined genre.

A twenty-third invention of the present application is the image displaying device, wherein the interpolation image generating portion defines the image signal to which the motion compensation processing has not been given as the interpolation image signal when the image tone mode set by the mode setting portion is the predetermined image tone mode, and defines the image signal to which the motion compensation processing has been given as the interpolation image signal when the image tone mode set by the mode setting portion is not the predetermined image tone mode.

A twenty-fourth invention of the present application is the image displaying device, wherein the interpolation image generating portion uses an image signal to which a linear interpolation processing has been given between the frames or fields of the input image signal as the image signal to which the motion compensation processing has not been given.

A twenty-fifth invention of the present application is the image displaying device, wherein the predetermined image tone mode is movie mode.

A twenty-sixth invention of the present application is the image displaying device, wherein the predetermined image tone mode is game mode.

A twenty-seventh invention of the present application is an image displaying method having a rate converting process for converting the number of frames or fields of an input image signal by interpolating an interpolation image signal between frames or fields of the input image signal, wherein the process in which a user is caused to select and set an image tone mode to set and adjust the image quality of a display image from a plurality of image tone modes prepared in advance is included, and the rate converting process has an interpolation image generating process for generating an interpolation image signal by giving the motion compensation processing to the input image signal based on motion vector information between frames or fields of the input image signal, and the interpolation image signal generated by reducing the strength of the compensation of the motion compensation processing is interpolated between the frames or fields of the input image signal when the image tone mode set by the user is a predetermined image tone mode set in advance as an image tone mode suitable for displaying a video image including a moving image likely to include the same consecutive images in a plurality of frames or fields.

Effects of the Invention

According to the present invention, the image quality determination of displayed images may effectively be prevented by not executing the interpolation processing through motion compensation when a predetermined image tone mode determined in advance (such as the movie mode or the game mode) of a plurality of image tone modes set in the image displaying device is selected by a user.

Figure 1:
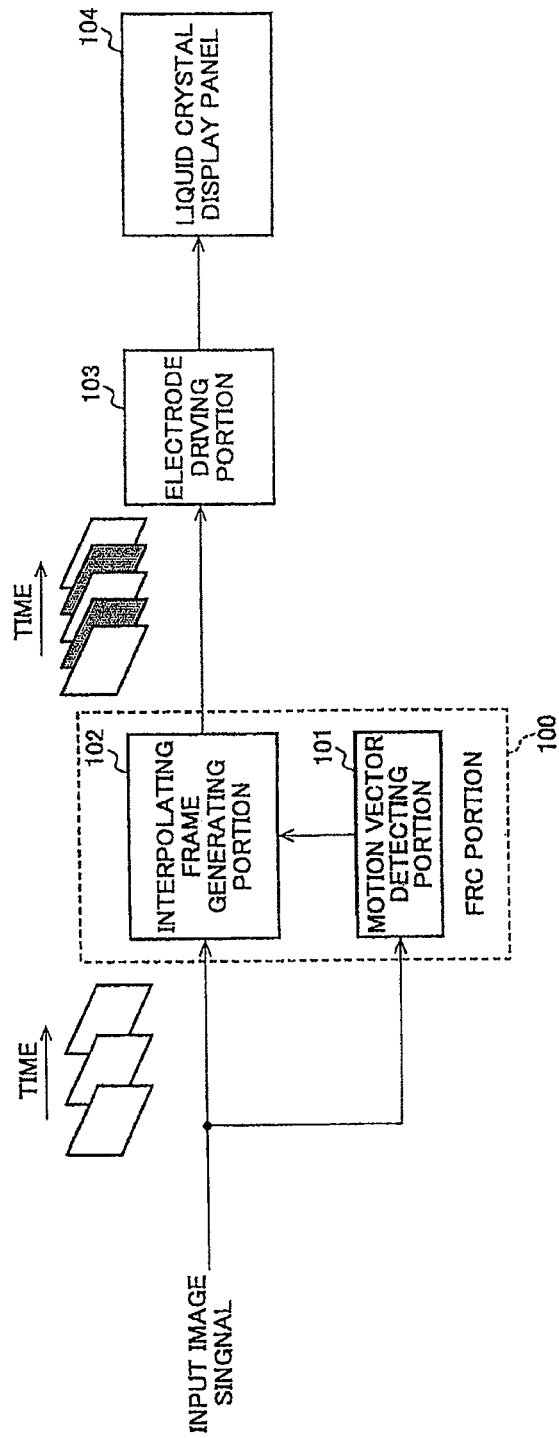
FIG. 1 is a block diagram of a schematic configuration of an FRC-driven display circuit in a conventional liquid crystal displaying device.
Figure 2:
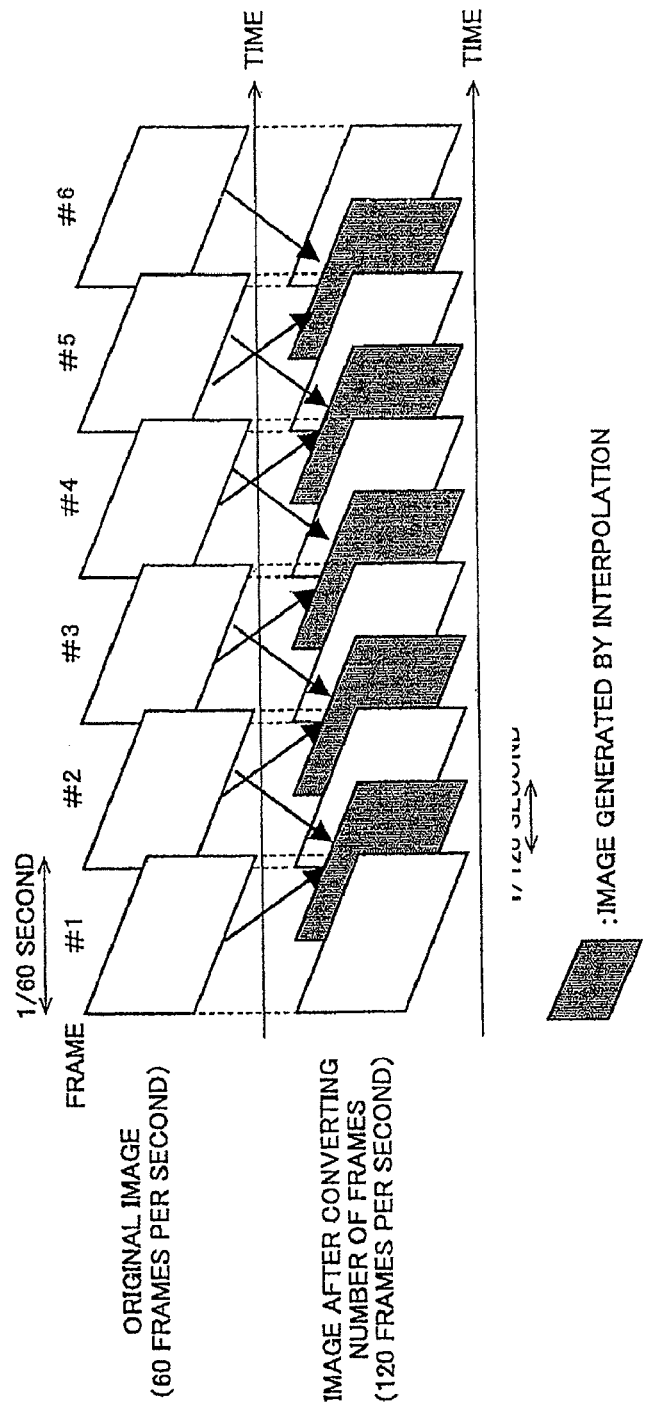
FIG. 2 is a diagram for explaining a frame rate conversion processing by the conventional FRC drive display circuit shown in FIG. 1.
Figure 3:
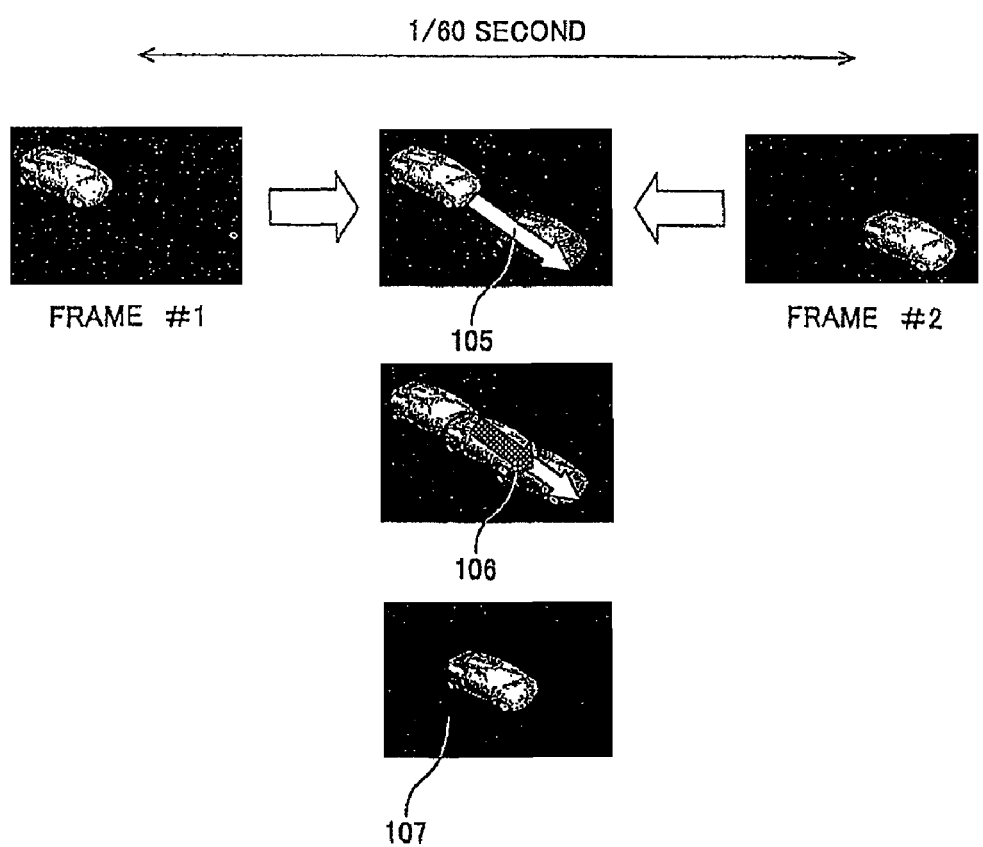
FIG. 3 is a diagram for explaining an interpolating frame generation processing of a motion vector detecting portion and an interpolating frame generating portion.
Figure 4:
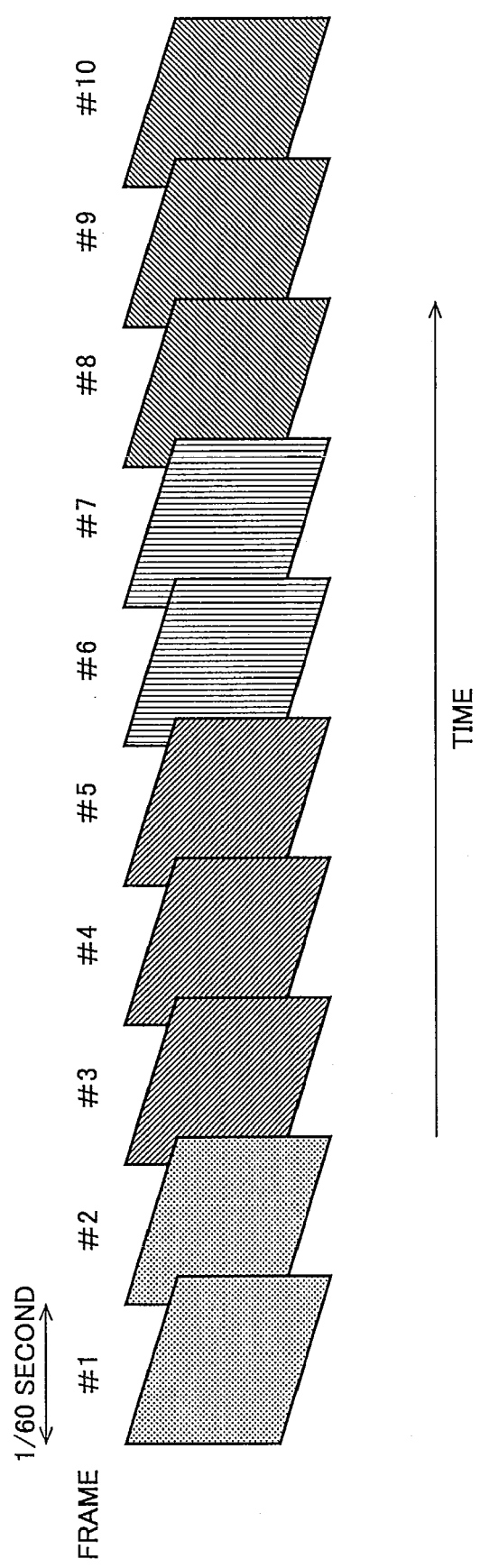
FIG. 4 is a diagram for explaining an image sequence when a 24-Hz filmed movie is converted by the 2-3-pull-down processing into a 60-Hz.

EXPLANATIONS OF REFERENCE NUMERALS 10, 100 . . . frame rate converting (FRC) portion, 11 . . . vector detecting portion, 11a . . . luminance signal extracting portion, 11b . . . preprocessing filter, 11c . . . motion detection frame memory, 11d . . . initial vector memory, 11e, 101 . . . motion vector detecting portion, 11f . . . interpolating vector evaluating portion, 12 . . . frame generating portion, 12a . . . interpolating frame memory, 12b, 102 . . . interpolating frame generating portion, 12c . . . time base conversion frame memory, 12d . . . time base converting portion, 12e . . . compensation intensity varying portion, 13 . . . remote control light receiving portion, 14 . . . controlling portion, 15 . . . image quality adjusting portion, 16 . . . switching portion, 17 . . . zero vector, 18, 103 . . . electrode driving portion, 19, 104 . . . liquid crystal display panel, 20 . . . path, 21 . . . memory, 22 . . . linear interpolation processing portion, 23 . . . black level signal insertion processing portion, 105 . . . motion vector, 106 . . . interpolating vector, 107 . . . interpolating frame

PREFERRED EMBODIMENT OF THE INVENTION

A preferred embodiment of an image displaying device of the present invention will now be described referring to the accompanying drawings. Although the present invention is applicable to either field signals and interpolation field signals or frame signals and interpolating frame signals, the frame signals and the interpolating frame signals will be described as a representative example since both (field and frame) are in a similar relationship with each other.

Figure 5:
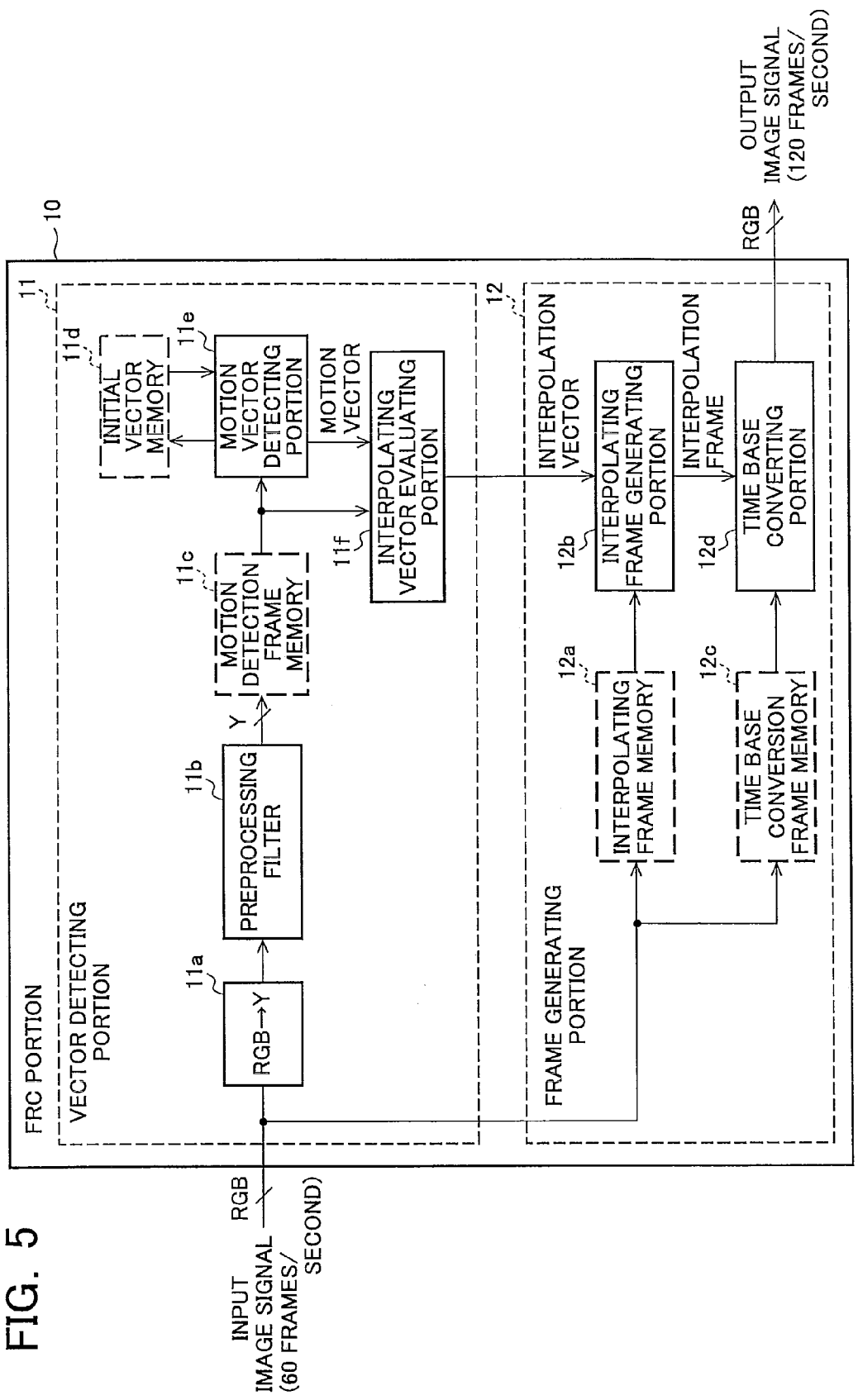
FIG. 5 is a block diagram of an exemplary configuration of a frame rate converting portion included in an image displaying device of the present invention.

FIG. 5 is a block diagram of an exemplary configuration of a motion compensated frame rate converting portion included in the image displaying device of the present invention, in FIG. 5, reference numeral 10 denotes a frame rate converting portion (hereinafter, FRC portion), and the FRC portion 10 corresponds to a rate converting portion of the present invention and is comprised of a vector detecting portion 11 that detects a motion vector between two consecutive frames included in an input image signal and a frame generating portion 12 that generates an interpolating frame (interpolation image) based on the detected motion vector. Although the iterative gradient method is used for the motion vector detection in the description of the vector detecting portion 11, the method is not limited to the iterative gradient method and may be the block matching method.

A feature of the iterative gradient method is that several types of movement amounts may be detected, and a motion vector may be detected even from a moving object having a small region since a motion vector may be detected for each block. The circuit configuration thereof may be realized in a smaller scale than other modes (such as the block matching method). In the iterative gradient method, an already detected motion vector of a neighboring block is defined as an initial deflection vector, which is used as a starting point to repeat calculations of the gradient method for a detected block. With this method, a substantially accurate movement amount may be acquired by repeating the gradient method about two times.

In FIG. 5, the vector detecting portion 11 includes a luminance signal extracting portion 11a that extracts a luminance signal (Y signal) from an input image signal (RGB signal), a preprocessing filter 11b that limits a high bandwidth by applying LPF to the extracted Y signal, a motion detection frame memory 11c, an initial vector memory 11d that accumulates initial vector candidates, a motion vector detecting portion 11e that detects motion vectors between frames with the use of the iterative gradient method, and an interpolating vector evaluating portion 11f that allocates an interpolating vector between the frames based on the detected motion vectors.

The FRC portion 10 corresponds to the rate converting portion of the present invention; the motion vector detecting portion 11e corresponds to a motion vector detecting portion of the present invention; and the interpolating vector evaluating portion 11f corresponds to an interpolating vector allocating portion of the present invention.

Since a differential component of a pixel is used for the calculations of the above iterative gradient method, the method is easily affected by noises and calculation errors are increased if large gradient variations exist in a detected block and, therefore, the LPF is applied by the preprocessing filter 11b to limit the high bandwidth. In the initial vector memory 11d, motion vectors (initial vector candidates) already detected in a frame immediately before the previous frame are accumulated as initial vector candidates.

The motion vector detecting portion 11e selects a motion vector closest to the motion vector of the detected block for an initial vector from the initial vector candidates accumulated in the initial vector memory 11d. The initial vector is selected by the block matching method from the already detected motion vectors (initial vector candidates) in neighboring blocks of the detected block. The motion vector detecting portion 11e uses the selected initial vector as a starting point to detect a motion vector between a previous frame and a current frame through the calculations of the gradient method.

The interpolating vector evaluating portion 11f evaluates the motion vectors detected by the motion vector detecting portion 11e, allocates an optimum interpolating vector to an interpolation block between frames based on the evaluation result, and outputs the vector to the frame generating portion 12.

The frame generating portion 12 includes an interpolating frame memory 12a that accumulates two input frames (previous frame and current frame), an interpolating frame generating portion 12b that generates an interpolating frame based on the two input frames from the interpolating frame memory 12a and the interpolating vector from the interpolating vector evaluating portion 11f, a time base conversion frame memory 12c for accumulating the input frames (previous frame and current frame), and a time base converting portion 12d that inserts the interpolating frame from the interpolating frame generating portion 12b into the input frames from the time base conversion frame memory 12c to generate an output image signal (RGB signal).

The interpolating frame generating portion 12b corresponds to an interpolation image generating portion of the present invention and the time base converting portion 12d corresponds to an image interpolating portion of the present invention.

Figure 6:
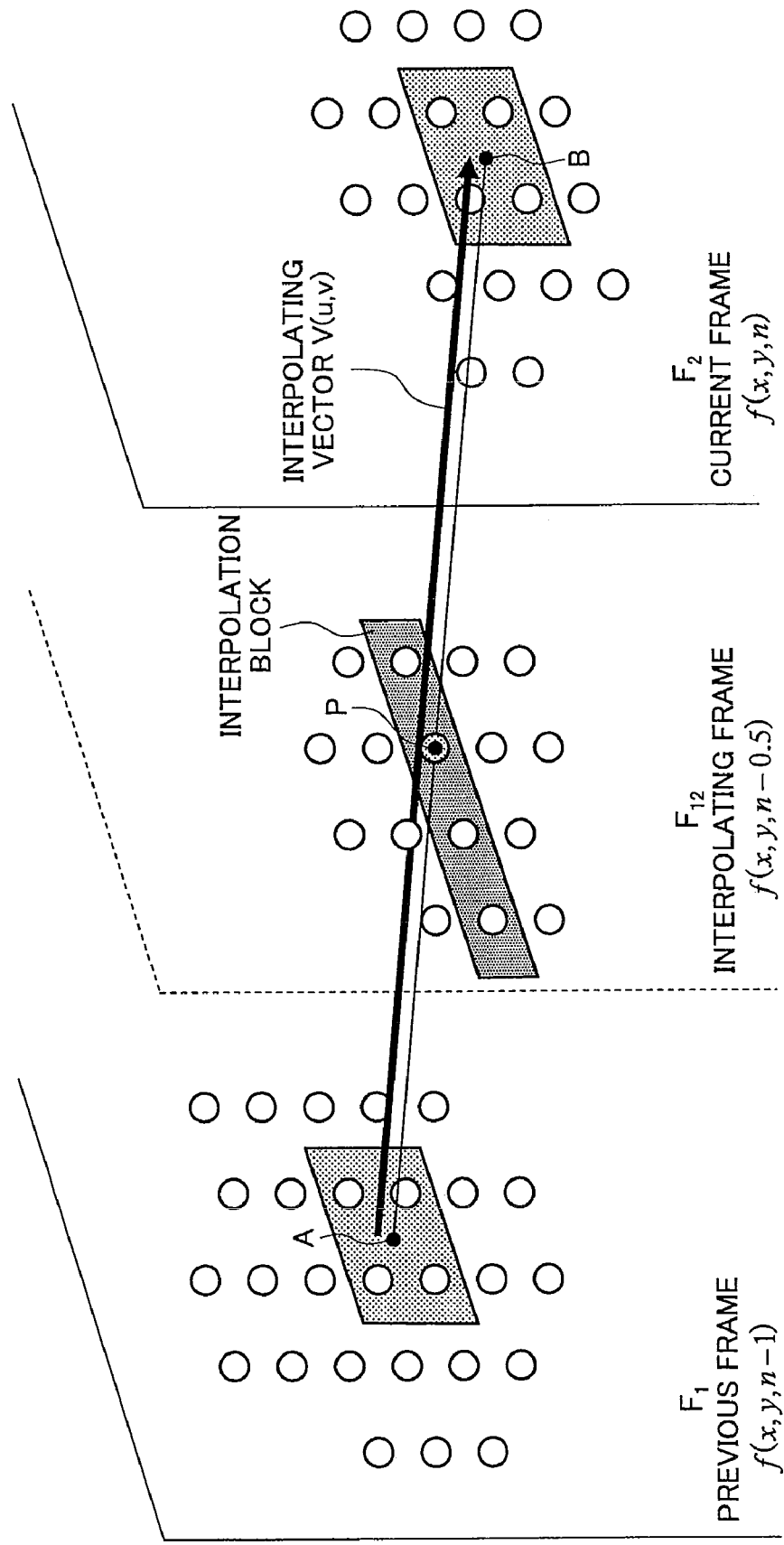
FIG. 6 is a diagram for explaining an example of an interpolating frame generation processing of a frame generating portion.

FIG. 6 is a diagram for explaining an example of the interpolating frame generating processing of the frame generating portion 12. The interpolating frame generating portion 12b stretches an interpolating vector V allocated to the interpolation block into the previous frame and the current frame and uses pixels located adjacent to the intersecting points with the frames to interpolate the pixels in the interpolation block. For example, in the previous frame $F_1$, the luminance of a point A is calculated from three adjacent points. In the current frame $F_2$, the luminance of a point B is calculated from three adjacent points. In the interpolating frame $F_{12}$, the luminance of a point P is interpolated using the luminance of the points A and B. The luminance of the point P may be an average of the luminance of the point A and the luminance of the point B, for example.

The interpolating frame $F_{12}$ generated as above is sent to the time base converting portion 12d. The time base converting portion 12d sandwiches the interpolating frame $F_{12}$ between the previous frame $F_1$ and the current frame $F_2$ to perform processing of converting a frame rate. In this way, the FRC portion 10 may convert the input image signal (60 frames/sec) into a motion-compensated output image signal (120 frames/sec), which may be output to a display panel to reduce the motion blur and improve the moving image quality. Although the 60-frame/sec input image signal is converted into the 120-frame/sec (double) output image signal in the frame rate conversion of this description, this is obviously applicable to the case of acquiring 90-frame/sec (1.5 times) and 180-frame/sec (three times) output image signals, for example.

The image displaying device of the present invention includes the FRC portion 10 shown in FIG. 5 and the main object thereof is to make the motion compensation processing of the FRC portion 10 ineffective over the entire screen (full screen) to prevent the image quality deterioration due to the FRC processing if the input image signals are image signals likely to include a plurality of the same consecutive images such as a movie video and an animation video because of the 2-3 pull-down processing or the 2-2 pull-down processing. Although the present invention is applicable to general image displaying devices having the hold-type display characteristics such as liquid crystal displays, organic EL displays, and electrophoretic displays, a representative example described in the following embodiments will be the case of applying the present invention to a liquid crystal displaying device using a liquid crystal display panel for a display panel.

In a first embodiment of the present invention, the output of the motion vector detecting portion 11e is forced to be zero vector to make the motion compensation processing of the FRC portion 10 ineffective when a predetermined image tone mode such as, for example, the movie mode or the game mode of a plurality of image tone modes set in the liquid crystal displaying device is selected by a user.

Figure 7:
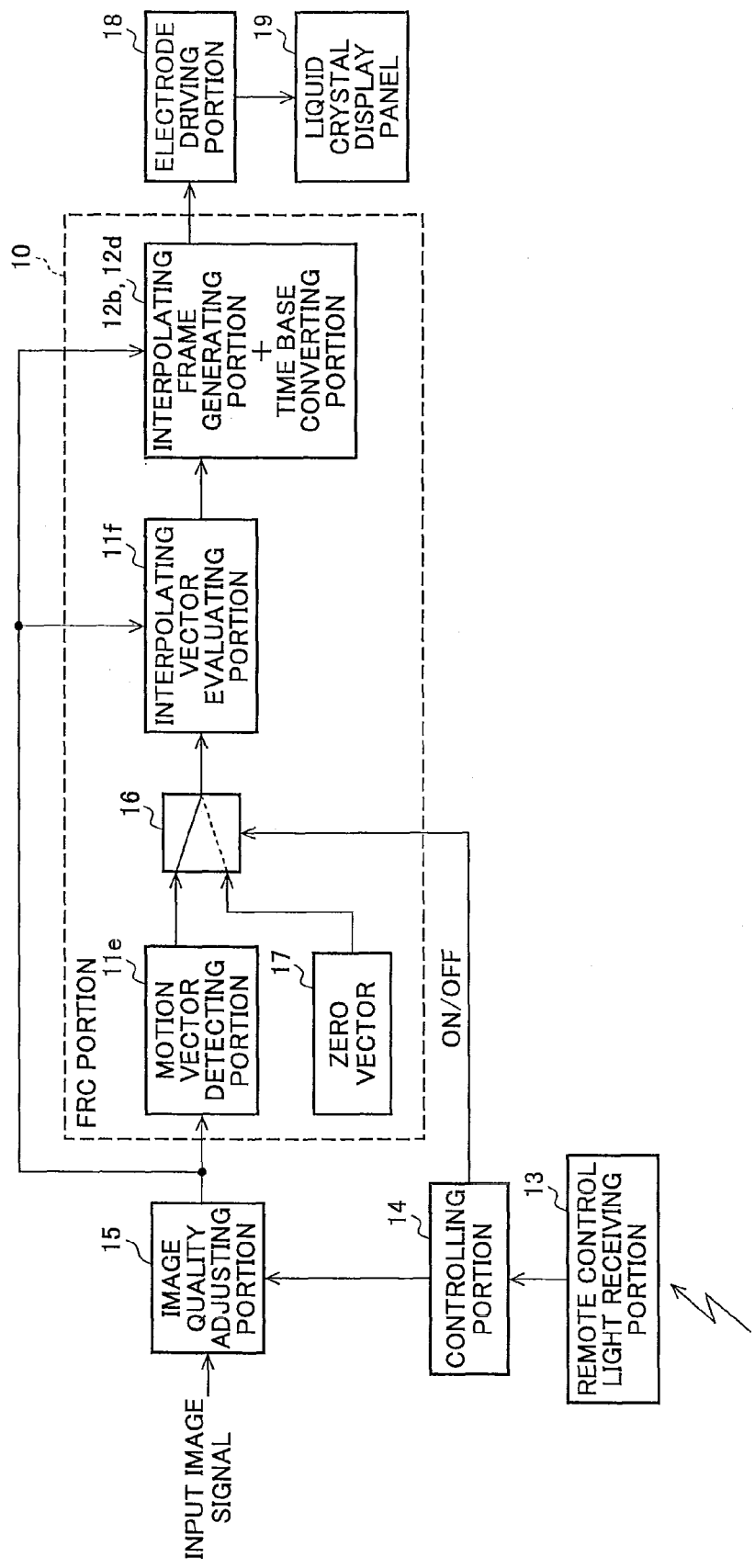
FIG. 7 is a block diagram of an exemplary main configuration of a liquid crystal displaying device according to a first embodiment of the present invention.

FIG. 7 is a block diagram of an exemplary main configuration of a liquid crystal displaying device according to the first embodiment of the present invention and the liquid crystal device includes the FRC portion 10, a remote control light receiving portion 13, a controlling portion 14, an image quality adjusting portion 15, a switching portion 16, a zero vector portion 17, an electrode driving portion 18, and a liquid crystal display panel 19. The switching portion 16 is disposed between the motion vector detecting portion 11e and the interpolating vector evaluating portion 11f within the FRC portion 10 and switches over the motion vector from the motion vector detecting portion 11e to the zero vector portion 17 in accordance with the instruction from the controlling portion 14.

The remote control light receiving portion 13 receives a remote control signal transmitted from a remote control (remote control device) (not shown), and outputs the received signal to the controlling portion 14. The controlling portion 14 analyzes the remote control signal received by the remote control light receiving portion 13 and controls each portion according to an operation instruction of the user. In this case, in the liquid crystal device of the embodiment, a "standard mode", a "dynamic mode", a "movie mode", and a "game mode" are set as the image tone modes and the user is able to instruct the device to select any one of the image tone modes by operating a remote controller (not shown).

The controlling portion 14 analyzes the remote control signal received by the remote control light receiving portion 13 and when it is instructed to select an image tone mode by the user, it outputs to the image quality adjusting portion 15 adjustment values for luminance, gray scale, black level, color thickness, hue, contour emphasis (sharpness), etc., of the screen that are stored corresponding to the image tone mode. The image quality adjusting portion 15 applies a predetermined image quality adjustment to the input image signal based on the output from the controlling portion 14.

For example, when a movie program or movie software is viewed, a user operates a remote controller (not shown), selects the "movie mode" and, thereby, is able to adjust the image quality that is suitable for viewing of a movie. Similarly, when a video game is viewed, the user selects the "game mode" and, thereby, is able to adjust the image quality that is suitable for viewing of the video game. That is, when the user selects the "movie mode", a movie video image is highly probably input and, when the user selects the "game mode", a game (CG) video image is highly probably input.

Figure 8:
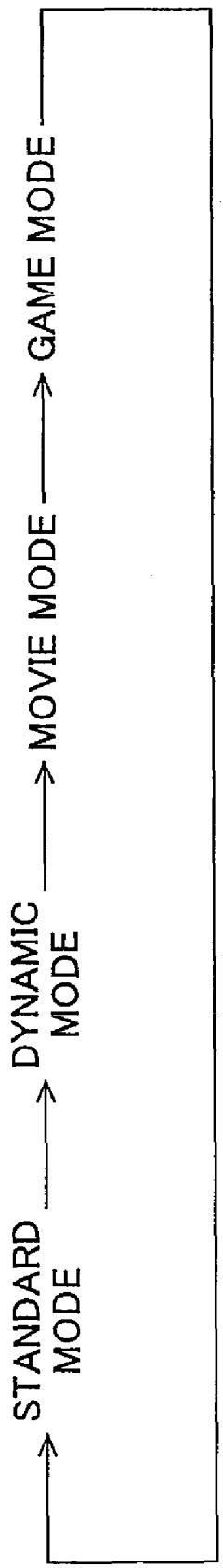
FIG. 8 is a diagram for explaining the order of selecting and switching image tone modes of the liquid crystal displaying device according to the first embodiment of the present invention.

In the embodiment, as shown in FIG. 8, every time an image tone mode selection button provided on the remote controller (not shown) is pressed, the image tone mode is shifted in order of "standard mode"→"dynamic mode"→"movie mode"→"game mode"→"standard mode"→ . . . However, the method of selection operation of the image tone mode is not limited to this.

The liquid crystal display panel 19 is an active-matrix liquid crystal display that includes a liquid crystal layer and electrodes to apply a scan signal and a data signal to the liquid crystal layer. The electrode driving portion 18 is a display driver to drive the scan electrodes and the data electrodes of the liquid crystal panel 19 based on the image signal to which the frame rate conversion by the FRC portion 10 has been given. The controlling portion 14 includes a CPU for controlling the above portions and performs control such that the motion compensation processing of the FRC portion 10 is made ineffective when it is determined that an image tone mode selected by a user is a predetermined image tone mode.

The drive frequency of the liquid crystal display panel 19 is a frame frequency converted by the FRC portion 10. Therefore, if an image signal input with a frame frequency of 60 Hz is converted by the FRC portion 10 into a frame frequency of 120 Hz, the drive frequency of the liquid crystal display panel 19 is 120 Hz. However, if the frame frequency conversion of the FRC processing is not performed and the input image signal is directly displayed and output, the drive frequency of the liquid crystal display panel 19 is the frame frequency of the input image signal.

Because a movie video image or a CG video image is highly probably input when the image tone mode selected by a user is "movie mode" or "game mode", the controlling portion 14 switches the switching portion 16 to the zero-vector 17 to forcibly replace the motion vector detected by the motion vector detecting portion 11e with the zero-vector. When the image tone mode selected by the user is a mode other than "movie mode" and "game mode" (that is "standard mode" or "dynamic mode" in the embodiment), the switching portion 16 is switched to the motion vector detecting portion 11e to input the motion vector detected by the motion vector detecting portion 11e to the interpolating vector evaluating portion 11f.

Therefore, the moving image quality may be improved by the motion-compensated FRC processing at the time of the normal moving image display and, when a moving image such as movie or game (CG) likely to include a plurality of the same consecutive images is input, the detection errors, the motion compensation errors, etc., of the motion vector due to the discontinuity of the image movement are eliminated and the image quality may effectively be prevented from deteriorating due to the motion-compensated FRC processing by making the motion compensation processing ineffective with the motion vector set to zero-vector.

In a second embodiment of the present invention, when a predetermined image tone mode such as, for example, movie mode or game mode of a plurality of image tone modes set in the liquid crystal displaying device is selected by a user, the interpolating vector from the interpolating vector evaluating portion 11f is set to zero-vector to make the motion compensation processing of the FRC portion 10 ineffective so that no interpolation can occur between pixels located at different positions.

Figure 9:
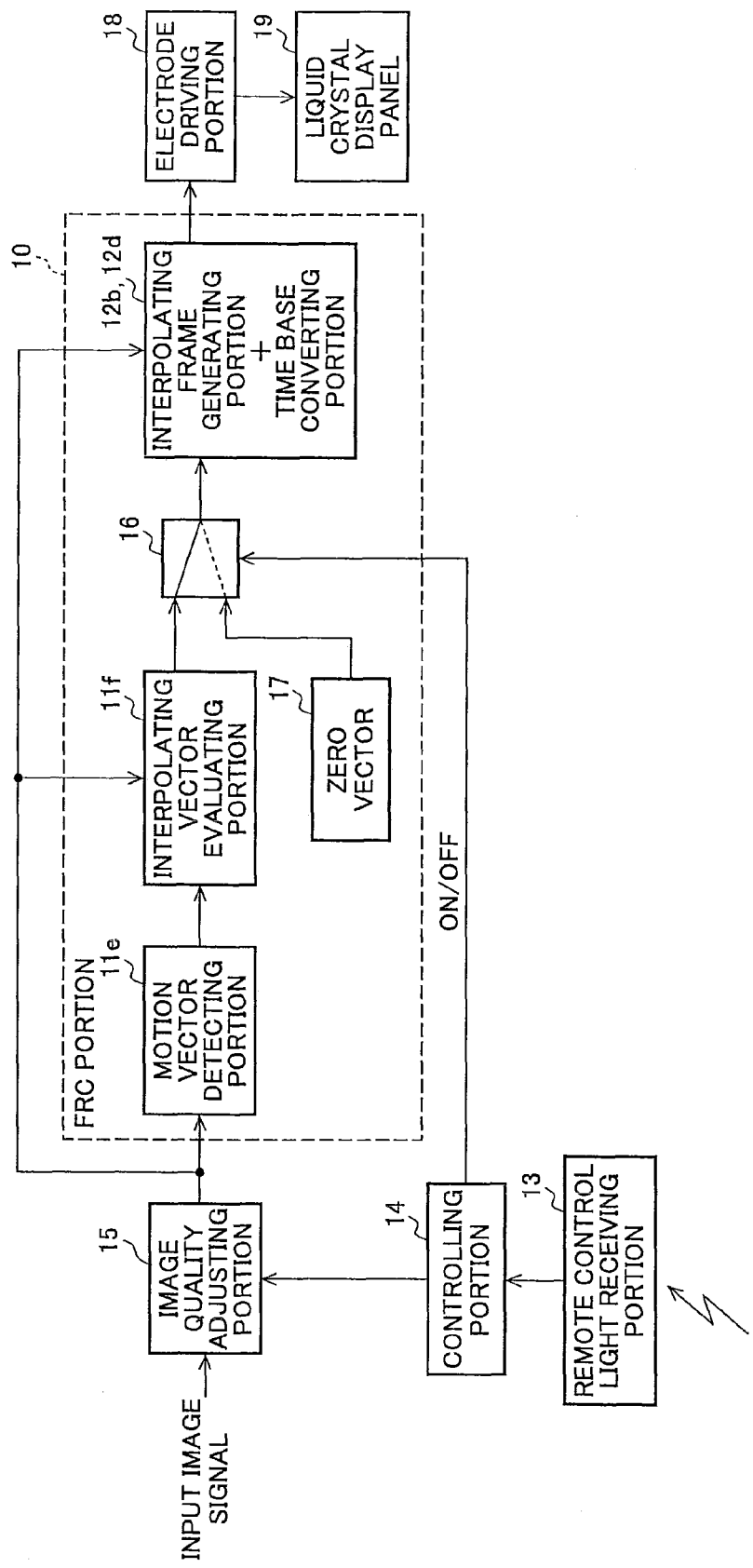
FIG. 9 is a block diagram of an exemplary main configuration of a liquid crystal displaying device according to a second embodiment of the present invention.

FIG. 9 is a block diagram of an exemplary main configuration of a liquid crystal displaying device according to the second embodiment of the present invention and the liquid crystal displaying device includes the FRC portion 10, the remote control light receiving portion 13, the controlling portion 14, the image quality adjusting portion 15, the switching portion 16, the zero-vector portion 17, the electrode driving portion 18, and the liquid crystal display panel 19. The switching portion 16 is disposed between the interpolating vector evaluating portion 11f and the interpolating frame generating portion 12b within the FRC portion 10 and switches the interpolating vector from the interpolating vector evaluating portion 11f to the zero-vector 17 in accordance with the instruction from the controlling portion 14.

Because a movie video image or a CG video image is highly probably input when the image tone mode selected by a user is "movie mode" or "game mode", the controlling portion 14 switches the switching portion 16 to the zero-vector 17 to set the interpolating vector allocated by the interpolating vector evaluating portion 11f to zero-vector. When the image tone mode selected by the user is "standard mode" or "dynamic mode", the switching portion 16 is switched to the interpolating vector evaluating portion 11f to input the interpolating vector allocated by the interpolating vector evaluating portion 11f to the interpolating frame generating portion 12b.

When the moving image such as movie or game (CG) likely to include a plurality of the same consecutive images is input, the detection errors, the motion compensation errors, etc., of the motion vector due to the discontinuity of the image movement are eliminated in the same was as described in the first embodiment and the image quality may effectively be prevented from deteriorating due to the motion-compensated FRC processing by making the motion compensation processing ineffective with the interpolating vector forcibly set to zero-vector.

In a third embodiment of the present invention, a path is provided to bypass the FRC portion 10 and, when a predetermined image tone mode such as, for example, movie mode or game mode of the plurality of image tone modes set in the liquid crystal displaying device is selected by a user, the input image signal is input to the bypass to change the drive frequency of the liquid crystal display panel 19 in conformity with the frame frequency of the input image signal. When a predetermined image tone mode determined in advance is selected, the switching is performed such that the input image signal is directly output and displayed on the liquid crystal display panel 19 without performing the frame rate conversion.

Figure 10:
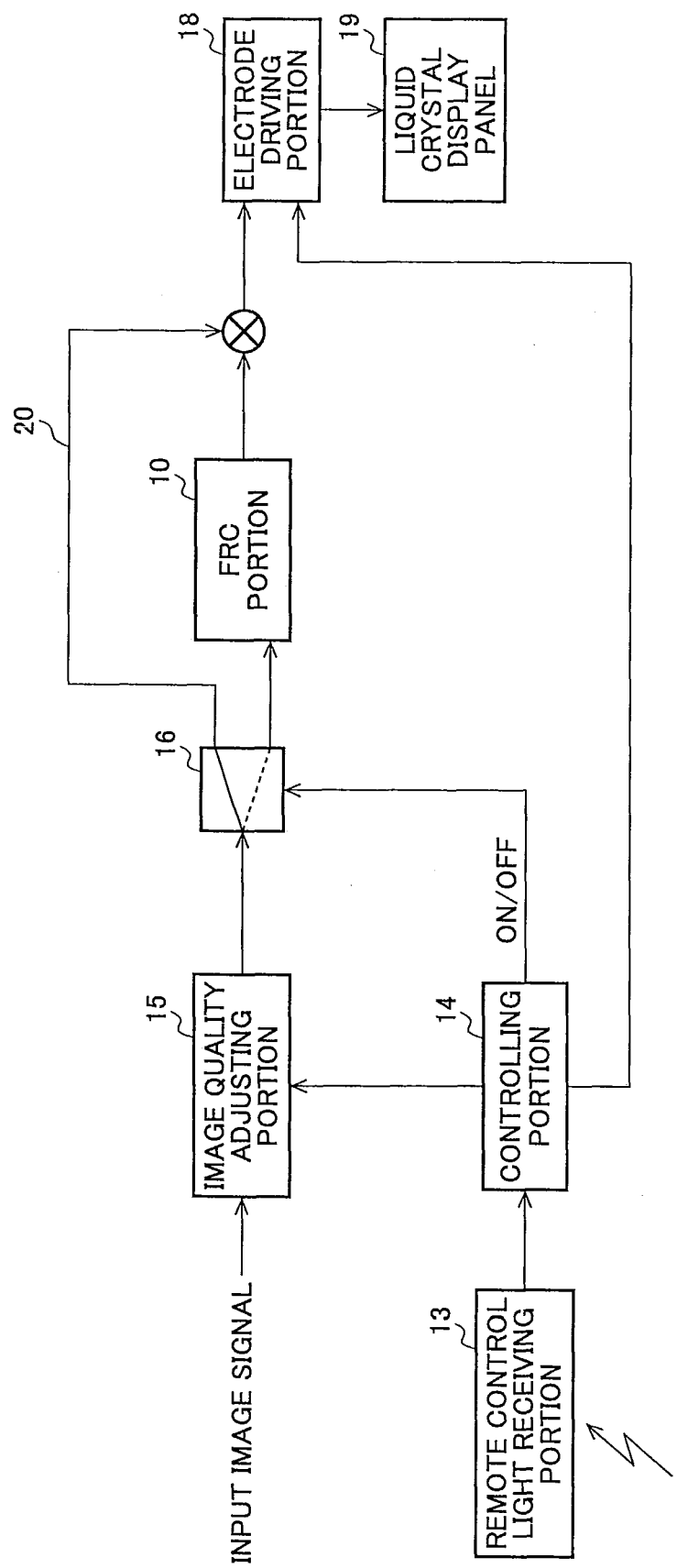
FIG. 10 is a block diagram of an exemplary main configuration of a liquid crystal displaying device according to a third embodiment of the present invention.

FIG. 10 is a block diagram of an exemplary main configuration of a liquid crystal displaying device according to the third embodiment of the present invention and the liquid crystal displaying device includes the FRC portion 10, the remote control light receiving portion 13, the controlling portion 14, the image quality adjusting portion 15, the switching portion 16, the electrode driving portion 18, the liquid crystal display panel 19, and a path 20 for bypassing the FRC portion 10. The switching portion 16 is disposed on the previous stage of the FRC portion 10 and switches the input image signal to input whether to the FRC portion 10 or to the path 20 in accordance with the instruction from the controlling portion 14.

When the image tone mode selected by the user is "movie mode" or "game mode", the controlling portion 14 shifts the switching portion 16 to the path 20 to bypass the FRC portion 10. When the image tone mode selected by the user is "standard mode" or "dynamic mode", the switching portion 16 is shifted to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the path 20 are switched over to output to the liquid crystal display panel 19.

In this embodiment, the controlling portion 14 may change the drive frequency of the liquid crystal display panel 19, and when "movie mode" or "game mode" is selected, the input image signal is input to the path 20 to change the drive frequency of the liquid crystal display panel 19 in conformity with the frame frequency of the input image signal.

Figure 11:
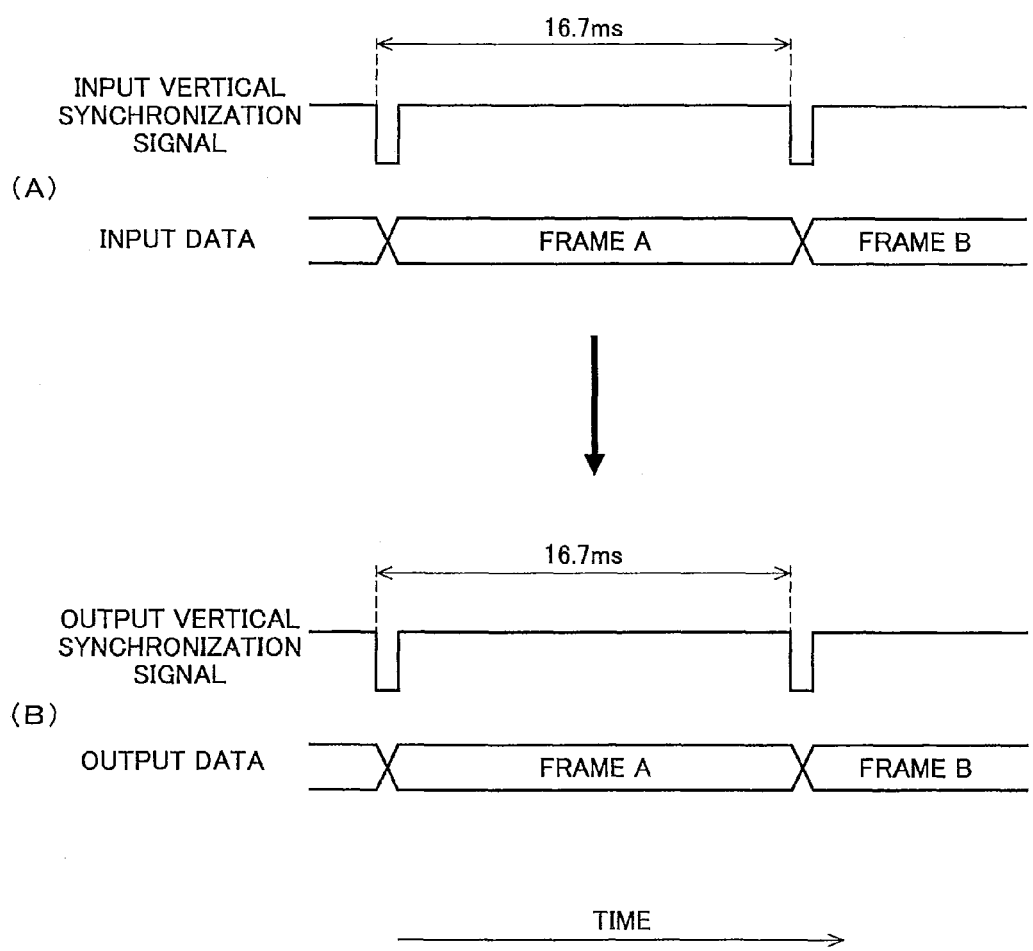
FIG. 11 is a diagram of a relationship between input data and output data according to the third embodiment of the present invention.

FIG. 11 is a diagram of a relationship between input data and output data according to the third embodiment of the present invention. FIG. 11(A) depicts the input data to the path 20 and FIG. 11(B) depicts the output data from the path 20. As shown in FIG. 11(A), if the input image signal (input data) is input to the path 20 with a frame frequency of 60 Hz, the display time per frame is about 16.7 ms. The controlling portion 15 controls the electrode driving portion 18, which is the display driver, to change the drive frequency of the liquid crystal display panel 19 from 120 Hz to 60 Hz and causes the input data to be output from the path 20 at 60 Hz without performing the frame rate conversion as shown in FIG. 11(B).

Since the liquid crystal display panel 19 displays the frame output from the path 20 without the frame rate conversion at the drive frequency of 60 Hz, the display time per frame is still about 16.7 ms.

Therefore, the moving image quality may be improved by the motion-compensated FRC processing at the time of the normal moving image display and, when the moving image such as movie or game (CG) likely to include a plurality of the same consecutive images is input, the detection errors, the motion compensation errors, etc., of the motion vector due to the discontinuity of the image movement are eliminated and the image quality may effectively be prevented from deteriorating due to the motion-compensated FRC processing by prohibiting the frame rate conversion itself with the FRC processing bypassed.

In a fourth embodiment of the present invention, a path is provided to bypass the FRC portion 10 and, when a predetermined image tone mode such as, for example, movie mode or game mode of the plurality of image tone modes set in the liquid crystal displaying device is selected by a user, the input image signal is input to the bypass to accumulate the input image signal in a memory on the path and the frame rate is converted by rapidly and repeatedly reading the image signal of the same frame from the memory more than once. When a predetermined image tone mode is selected, the switching is performed such that the input image signal is rapidly and sequentially output to convert the frame rate and is output and displayed on the liquid crystal display panel 19 without performing the motion-compensated frame rate conversion.

Figure 12:
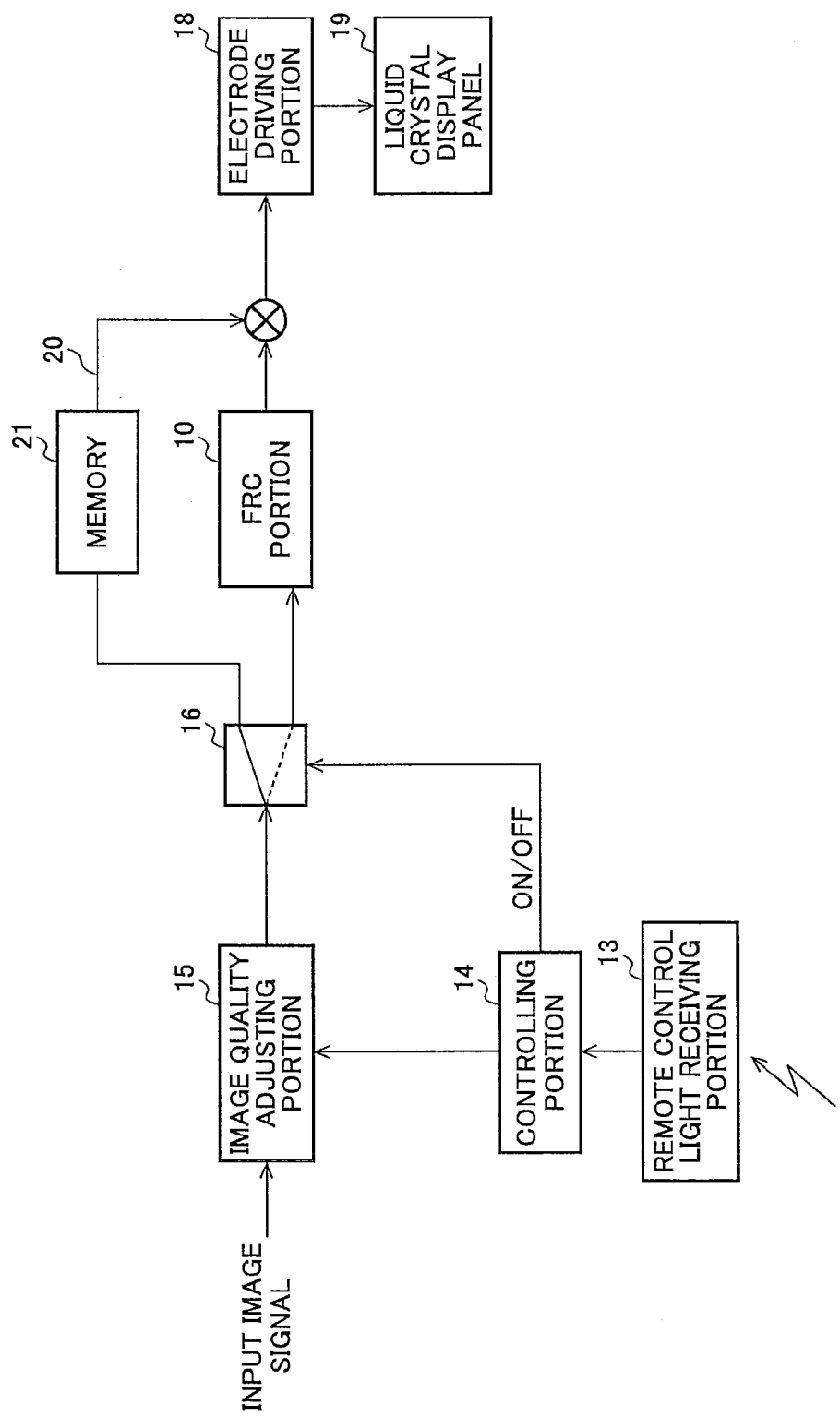
FIG. 12 is a block diagram of an exemplary main configuration of a liquid crystal displaying device according to a fourth embodiment of the present invention.

FIG. 12 is a block diagram of an exemplary main configuration of a liquid crystal displaying device according to the fourth embodiment of the present invention and the liquid crystal displaying device includes the FRC portion 10, the remote control light receiving portion 13, the controlling portion 14, the image quality adjusting portion 15, the switching portion 16, the electrode driving portion 18, the liquid crystal display panel 19, the path 20 for bypassing the FRC portion 10, and a memory 21 on the path 20. The switching portion 16 is disposed on the previous stage of the FRC portion 10 and switches the input image signal to input whether to the FRC portion 10 or to the path 20 in accordance with the instruction from the controlling portion 14.

When the image tone mode selected by a user is "movie mode" or "game mode", the controlling portion 14 shifts the switching portion 16 to the path 20 to bypass the FRC portion 10 and to accumulate the input image signal in the memory 21. The frame insert processing is subsequently performed by repeatedly reading the same frame from the memory 21 more than once. When the image tone mode selected by the user is "standard mode" or "dynamic mode", the switching portion 16 is switched to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the memory 21 are switched over to output to the liquid crystal display panel 19.

In this embodiment, the drive frequency of the liquid crystal display panel 19 is not changed and is maintained at 120 Hz. When "movie mode" or "game mode" is selected, the controlling portion 14 and the memory 21 comprise a portion for converting the number of frames of the input image signal by inserting an image signal of the previous or subsequent frame between the frames of the input image signal. The frame rate (the number of frames) of the display image signal input to the electrode driving portion 18 is always the same.

Figure 13:
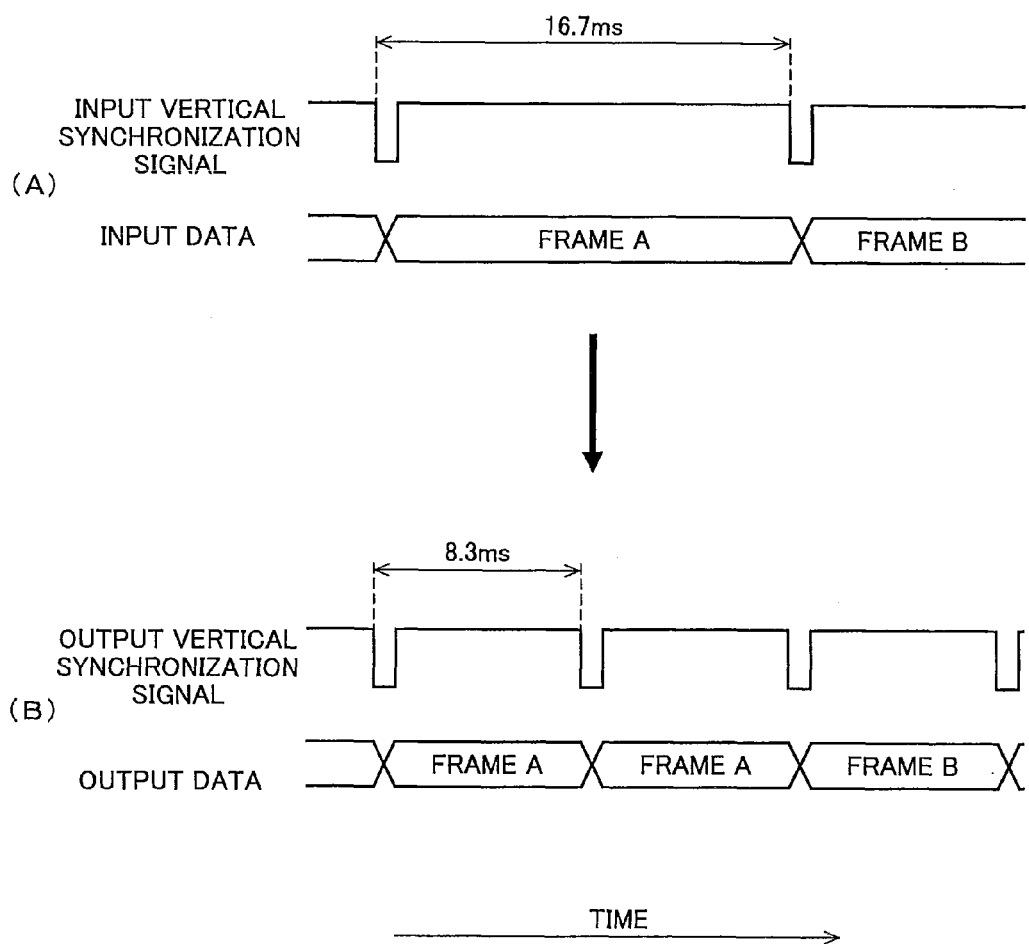
FIG. 13 is a diagram of a relationship between input data and output data according to the fourth embodiment of the present invention.

FIG. 13 is a view of a relationship between input data and output data according to the fourth embodiment of the present invention. FIG. 13(A) shows the input data to the path 20 and FIG. 13(B) shows the output data from the path 20. As shown in FIG. 13(A), if the input image signal (input data) is input to the path 20 with a frame frequency of 60 Hz, the display time per frame is about 16.7 ms. The input data are temporarily accumulated in the memory 21, and an image signal of the frame (in FIG. 13, frame A) is output which is repeatedly read from the memory 21 at double speed as shown in FIG. 13(B).

The liquid crystal display panel 19 displays the output data into which the image signal of the same frame has been inserted, at the drive frequency of 120 Hz. Since the number of frames is converted by repeatedly reading the same frame twice, the display time per frame is about 8.3 ms in this case.

When the moving image such as movie or game (CG) likely to include a plurality of the same consecutive images is input, the detection errors, the motion compensation errors, etc., of the motion vector due to the discontinuity of images are eliminated and the image quality may effectively be prevented from deteriorating due to the motion-compensated FRC processing by not performing the interpolation processing through motion compensation for the input image signal. Since the frame rate is converted by repeatedly reading the same frame in this case, the drive frequency of the liquid crystal display panel 19 does not need to be changed.

In a fifth embodiment of the present invention, a path is provided to bypass the FRC portion 10 and, when a predetermined image tone mode such as, for example, movie mode or game mode of the plurality of image tone modes set in the liquid crystal displaying device is selected by a user, the input image signal is input to the bypass and the input image signal is input to a linear interpolation processing portion on the path to interpolate an image signal to which the linear interpolation has been performed. When a predetermined image tone mode is selected, the switching is performed such that the frame rate is converted by performing the linear interpolation processing rather than the interpolation processing through motion compensation.

Figure 14:
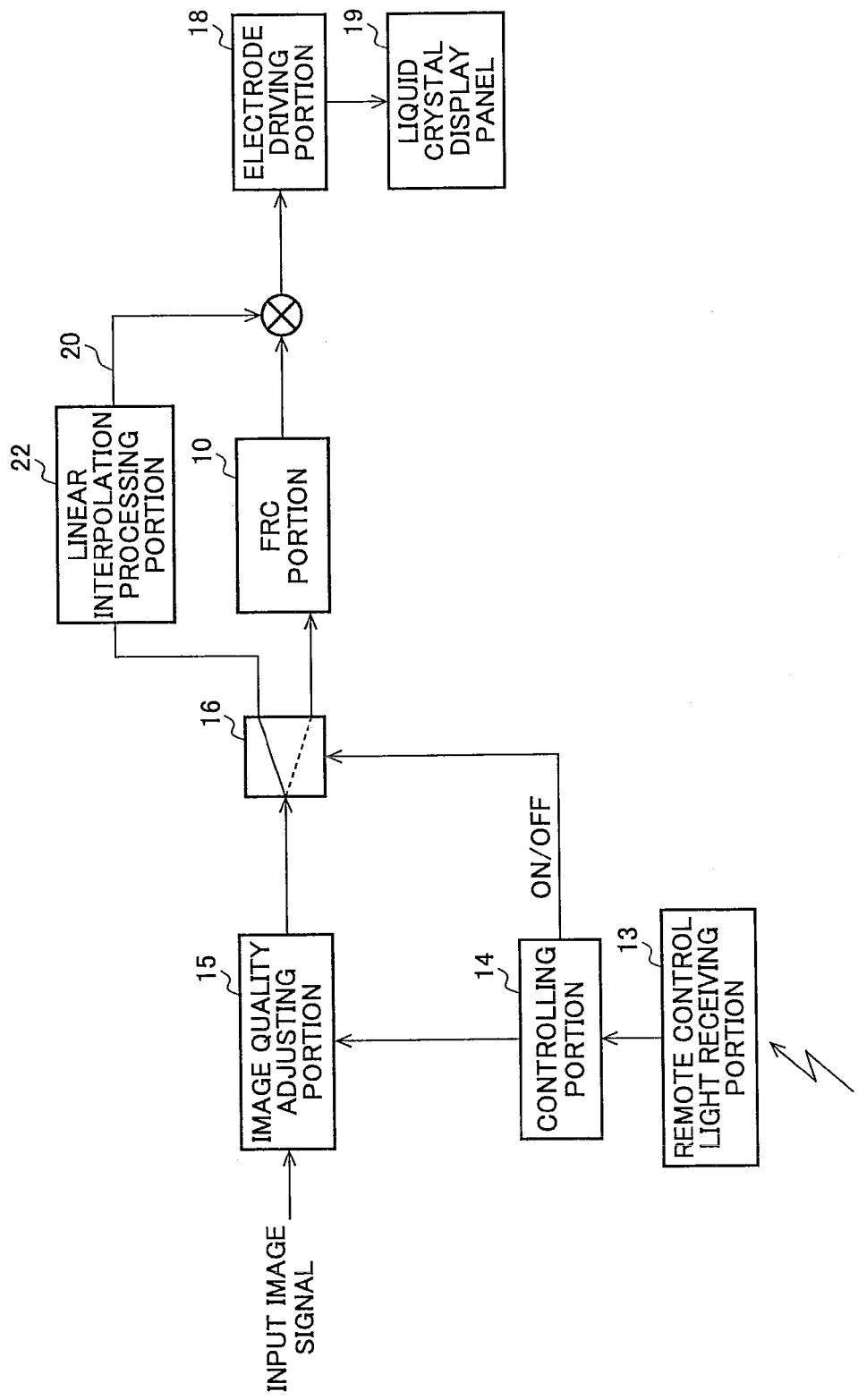
FIG. 14 is a block diagram of an exemplary main configuration of a liquid crystal displaying device according to a fifth embodiment of the present invention.

FIG. 14 is a block diagram of an exemplary main configuration of a liquid crystal displaying device according to the fifth embodiment of the present invention and the liquid crystal displaying device includes the FRC portion 10, the remote control light receiving portion 13, the controlling portion 14, the image quality adjusting portion 15, the switching portion 16, the electrode driving portion 18, the liquid crystal display panel 19, the path 20 for bypassing the FRC portion 10, and a linear interpolation processing portion 22 on the path 20. The switching portion 16 is disposed on the previous stage of the FRC portion 10 and switches the input image signal to input whether to the FRC portion 10 or to the path 20 in accordance with the instruction from the controlling portion 14.

When the image tone mode selected by a user is "movie mode" or "game mode", the controlling portion 14 shifts the switching portion 16 to the path 20 to bypass the FRC portion 10 and the input image signal is input to the linear interpolation processing portion 22. The linear interpolation processing portion 22 inserts an interpolating frame to which the linear interpolation processing has been given between frames. When the image tone mode selected by the user is "standard mode" or "dynamic mode", the switching portion 16 is switched to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the linear interpolation processing portion 22 are switched over to output to the liquid crystal display panel 19.

In this embodiment, the drive frequency of the liquid crystal display panel 19 is not changed and is maintained at 120 Hz. The frame rate (the number of frames) of the display image signal input to the electrode driving portion 18 is always the same. When "movie mode" or "game mode" is selected, the linear interpolation processing portion 22 comprises a portion for converting the number of frames of the input image signal by interpolating an image signal to which the linear interpolation processing has been given between the frames of the input image signal. In the linear interpolation processing, as described in the above document (Yamauchi Tatsuro, "TV Standards Conversion", Journal of the Institute of Television Engineers of Japan, Vol. 45, No. 12, pp. 1534-1543 (1991)), an interpolating frame is acquired through linear interpolation using a frame interpolation ratio α from the signal of the previous frame and the signal of the current frame.

Figure 15:
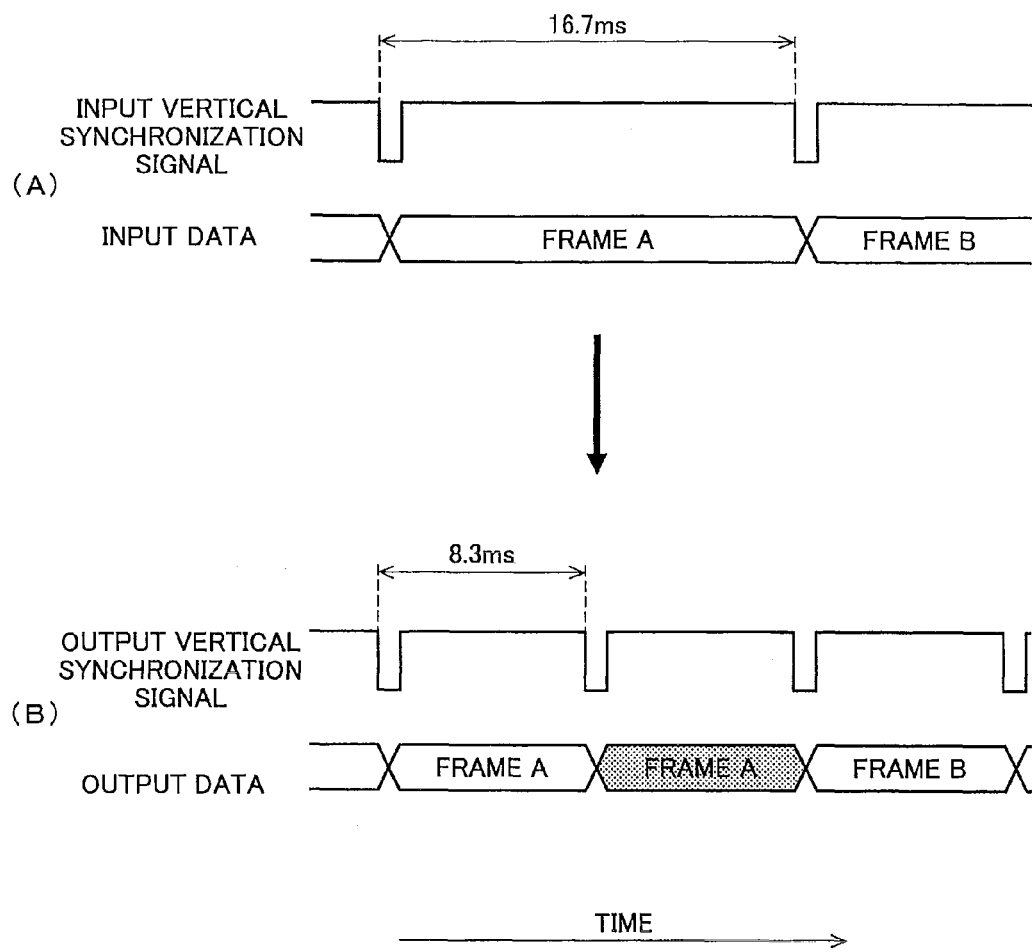
FIG. 15 is a diagram of a relationship between input data and output data according to the fifth embodiment of the present invention.

FIG. 15 is a view of a relationship between input data and output data according to the fifth embodiment of the present invention. FIG. 15(A) shows the input data to the path 20 and FIG. 15(B) shows the output data from the path 20. As shown in FIG. 15(A), if the input image signal (input data) is input to the path 20 with a frame frequency of 60 Hz, the display time per frame is about 16.7 ms. The input data are input to the linear interpolation processing portion 22, and the image signal to which the linear interpolation processing has been given (in FIG. 15, frame A+B) is interpolated and output between the frames (in this case, between frames A and B) as shown in FIG. 15(B).

The liquid crystal display panel 19 displays the output data into which the image signal to which the linear interpolation processing has been given, is interpolated at the drive frequency of 120 Hz. Since the number of frames is converted by interpolating the image signal to which the linear interpolation processing has been given, the display time per frame is about 8.3 ms in this case.

When the moving image such as movie or game (CG) likely to include a plurality of the same consecutive images is input, the detection errors, the motion compensation errors, etc., of the motion vector due to the discontinuity of images are eliminated and the image quality may effectively be prevented from deteriorating due to the motion-compensated FRC processing by not performing the interpolation processing through motion compensation for the input image signal. Since the frame rate is converted by interpolating the image signal to which the linear interpolation processing has been given in this case, the drive frequency of the liquid crystal display panel 19 does not need to be changed.

In a sixth embodiment of the present invention, a path is provided to bypass the FRC portion 10 and, when a predetermined image tone mode such as, for example, movie mode or game mode of the plurality of image tone modes set in the liquid crystal displaying device is selected by a user, the input image signal is input to the bypass and the input image signal is input to a black-level signal insertion processing portion on the path to insert a predetermined monochromatic image signal such as a black-level signal. When a predetermined image tone mode is selected, the switching is performed such that the frame rate is converted by performing the monochromatic image insertion processing rather than the interpolation processing through motion compensation.

Figure 16:
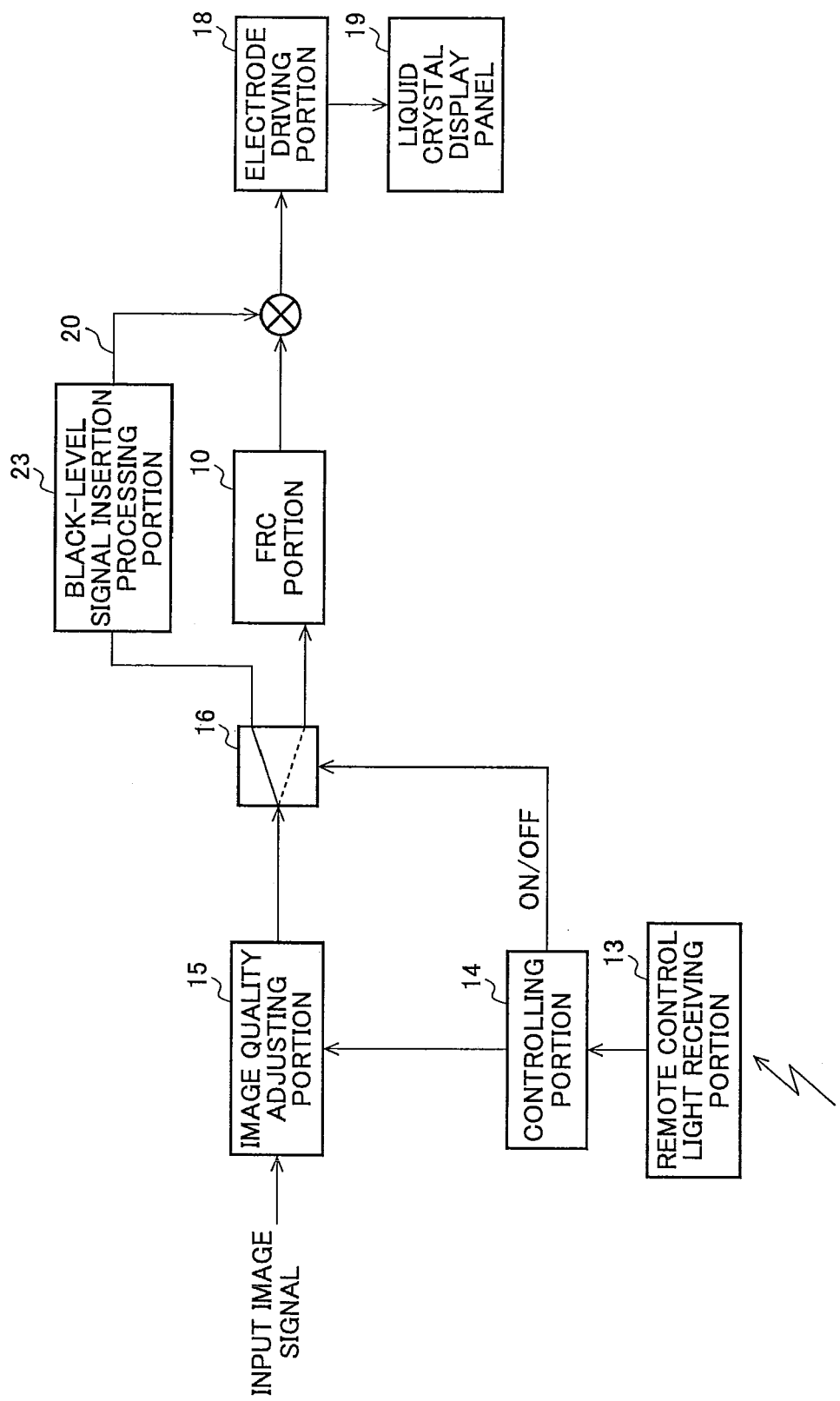
FIG. 16 is a block diagram of an exemplary main configuration of a liquid crystal displaying device according to a sixth embodiment of the present invention.

FIG. 16 is a block diagram of an exemplary main configuration of a liquid crystal displaying device according to the sixth embodiment of the present invention and the liquid crystal displaying device includes the FRC portion 10, the remote control light receiving portion 13, the controlling portion 14, the image quality adjusting portion 15, the switching portion 16, the electrode driving portion 18, the liquid crystal display panel 19, the path 20 for bypassing the FRC portion 10, and a black-level signal insertion processing portion 23 on the path 20. The switching portion 16 is disposed on the previous stage of the FRC portion 10 and switches the input image signal to input whether to the FRC portion 10 or to the path 20 in accordance with the instruction from the controlling portion 14.

When the image tone mode selected by a user is "movie mode" or "game mode", the controlling portion 14 shifts the switching portion 16 to the path 20 to bypass the FRC portion 10 and the input image signal is input to the black-level signal insertion processing portion 23. The black-level signal insertion processing portion 23 performs the time scale compression (frame rate conversion) for the input image signal, for example, with the use of a memory to insert the predetermined monochromatic image signal such as a black-level signal between the input frames. When the image tone mode selected by the user is "standard mode" or "dynamic mode", the switching portion 16 is shifted to the FRC portion 10 to perform the FRC processing (motion-compensated frame interpolation processing) for the input image signal. The switching portion 16 may be disposed on the subsequent stage of the FRC portion 10 such that the output signal of the FRC portion 10 and the output signal of the black-level signal insertion processing portion 23 are switched over to output to the liquid crystal display panel 19.

In this embodiment, the drive frequency of the liquid crystal display panel 19 is not changed and is maintained at 120 Hz. The frame rate (the number of frames) of the display image signal input to the electrode driving portion 18 is always the same. When "movie mode" or "game mode" is selected, the black-level signal insertion processing portion 23 comprises a portion for converting the number of frames of the input image signal by inserting the predetermined monochromatic image signal such as a black-level signal between the frames of the input image signal. Another embodiment of the black-level signal insertion processing may be configured such that the electrode driving portion 18 applies a voltage for writing black to the liquid crystal display panel 19 for a predetermined period (in the case of this example, 1/120 second).

Figure 17:
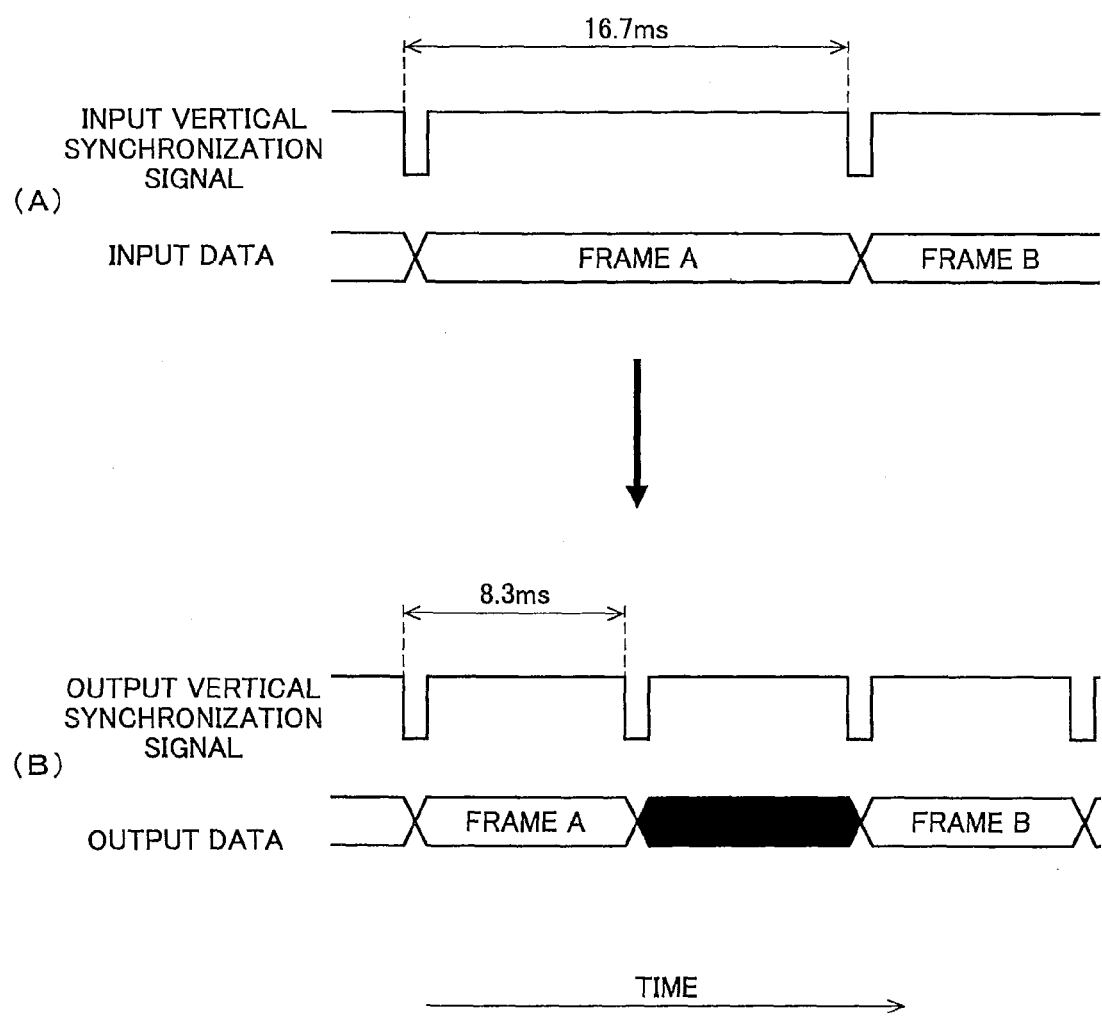
FIG. 17 is a diagram of a relationship between input data and output data according to the sixth embodiment of the present invention.

FIG. 17 is a view of a relationship between input data and output data according to the sixth embodiment of the present invention. FIG. 17(A) shows the input data to the path 20 and FIG. 17(B) shows the output data from the path 20. As shown in FIG. 17(A), if the input image signal (input data) is input to the path 20 with a frame frequency of 60 Hz, the display time per frame is about 16.7 ms. The input data are input to the black-level signal insertion processing portion 23, and a black-level signal (in FIG. 17, black-colored frame) is inserted and output between the frames (in this case, between the frames A and B) as shown in FIG. 17(B).

Although the image quality deterioration due to the motion blur is improved and the image quality deterioration due to the motion compensation error is not generated by inserting the black image signal between the frames of the input image signal in this way, the emission luminance must be increased in a backlight (not shown) disposed on the backside of the liquid crystal display panel 19 to compensate the reduction of the display luminance due to the shortening of the image display period.

The liquid crystal display panel 19 displays the output data, into which the black-level signal has been inserted, at the drive frequency of 120 Hz. Since the number of frames is converted by inserting the black-level signal, the display time per frame is about 8.3 ms in this case.

When a moving image such as movie or game (CG) likely to include a plurality of the same consecutive images is input, the detection errors, the motion compensation errors, etc., of the motion vector due to the discontinuity of images are eliminated and the image quality may effectively be prevented from deteriorating due to the motion-compensated FRC processing by not performing the interpolation processing through motion compensation for the input image signal. Since the frame rate is converted by inserting the monochromatic image signal in this case, the drive frequency of the liquid crystal display panel 19 does not need to be changed. The moving image quality improving effect may also be maintained in this case.

Other than the above embodiment, when a predetermined image tone mode such as movie mode or game mode is selected, the image quality may be prevented from deteriorating due to the motion-compensated FRC processing and the moving image quality improving effect may be maintained at the same time by dividing the original image of the input frame into a plurality of frame images at a predetermined luminance ratio for the frame rate conversion.

In a seventh embodiment of the present invention, when a predetermined image tone mode such as, for example, movie mode or game mode of the plurality of image tone modes set in the liquid crystal displaying device is selected by a user, the compensation intensity of the motion compensation processing may be varied in the interpolating frame generating portion. Specifically, the weighted addition rate may be varied when the pull-down converted image signal is input by providing the interpolating frame generating portion that performs weighted addition of the image signal to which the motion compensation processing has been given and the image signal to which the linear interpolation processing has been given at a predetermined rate to generate an interpolating frame.

Figure 18:
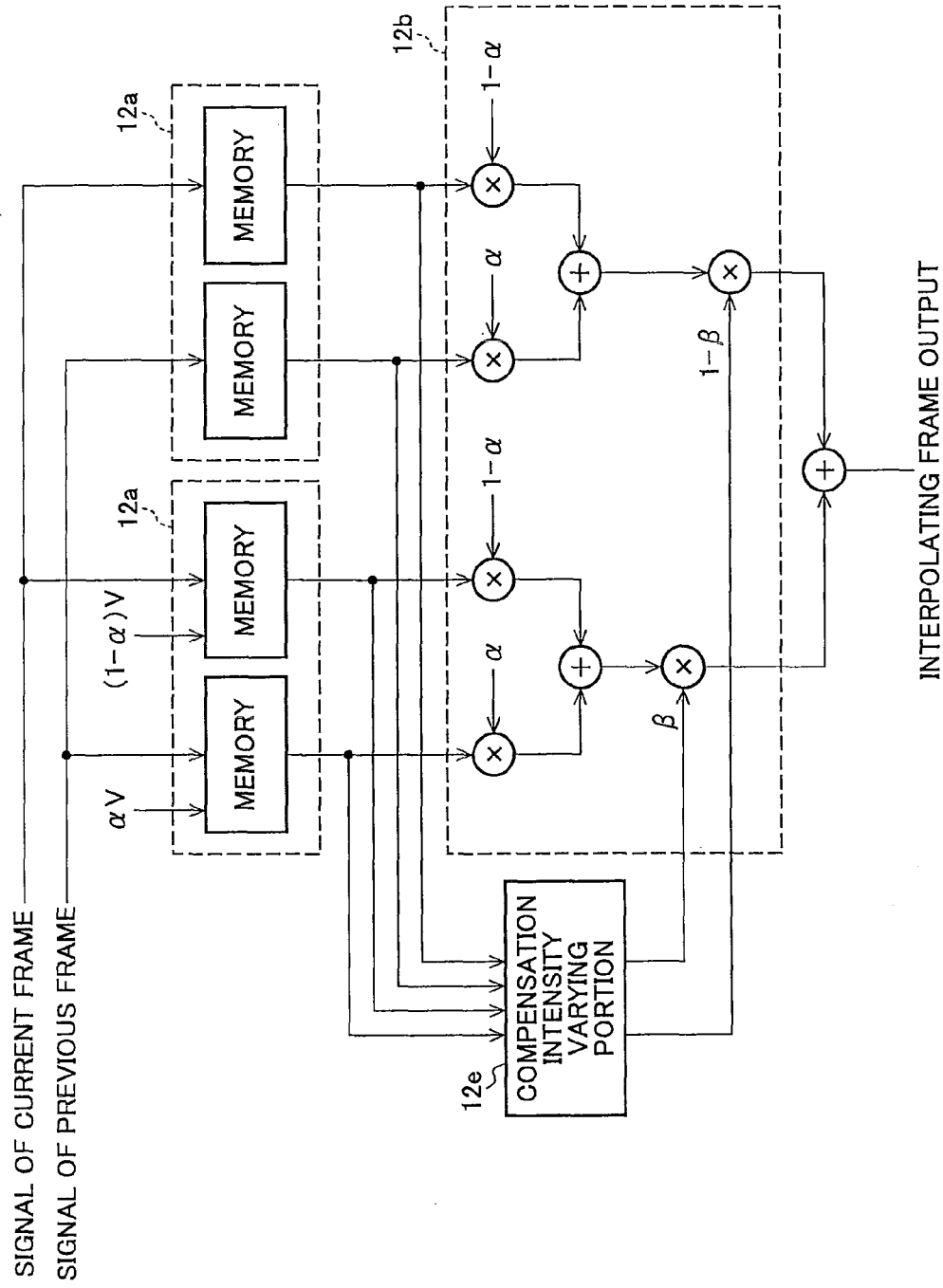
FIG. 18 is a block diagram of an exemplary main configuration of an FRC portion according to a seventh embodiment of the present invention.

FIG. 18 is a block diagram of an exemplary main configuration of the FRC portion 10 according to the seventh embodiment of the present invention, and the frame generating portion 12 of the FRC portion 10 includes the interpolating frame memory 12a, the interpolating frame generating portion 12b, and a compensation intensity varying portion 12e that may vary the compensation intensity of the motion compensation processing in the FRC portion 10. In FIG. 18, V denotes an interpolating vector; α denotes a frame interpolation ratio; and β denotes interpolation intensity (weighted addition rate).

Generally, for example, the frame interpolation through the linear interpolation between two frames and the frame interpolation using motion vectors (motion compensated interpolation) are known as methods of the frame interpolation processing. In the former case, an interpolating frame is acquired by the linear interpolation from the signal of the previous frame and the signal of the current frame at a frame interpolation ratio α. Therefore, using this linear interpolation may prevent the image quality deterioration due to the motion compensation errors in the FRC processing.

On the other hand, to acquire an interpolating frame from the previous frame and the current frame in the latter case, the interpolating vector V is detected from the motion vectors between the previous frame image and the current frame image, and the interpolating frame is acquired from the weighted addition of a signal of the previous frame image shifted by a degree of αV obtained by dividing the value (interpolating vector V) by the frame interpolation ratio α and a signal of the current frame image shifted by (1−α)V. Although good image quality may be acquired without deteriorating the resolution since a moving image itself is captured and compensated by using this motion-compensated interpolation, the image quality may be deteriorated in the pulled-down video due to this processing.

Therefore, in this embodiment, the compensation intensity varying portion 12e is disposed in the frame generating portion 12. When the image tone mode selected by a user is "movie mode" or "game mode", the compensation intensity varying portion 12e varies the weighted addition rate β. The weighted addition rate β is a rate for performing the weighted addition of the image signal to which the motion compensation processing has been given and the image signal to which the linear interpolation processing has been given. The interpolating frame generating portion 12b of this embodiment performs the weighted addition of the linear interpolation and the motion-compensated interpolation in accordance with the weighted addition rate β to generate the interpolating frame.

For example, when the image tone mode selected by the user is "movie mode" or "game mode", the compensation intensity varying portion 12e sets the weighted addition rate β=0 and defines the image signal to which the linear interpolation processing has been given as the interpolating frame to prevent the image deterioration. On the other hand, when the image tone mode selected by the user is "standard mode" or "dynamic mode", the weighted addition rate β=1 is set to define the image signal to which the motion compensation processing has been given as the interpolating frame to achieve better image quality for the moving image.

Since the weighted addition rate β may arbitrarily and variably be set, the rate may be set to a substantially intermediate value between zero and one. This enables to control the deterioration of the image quality and to perform the motion compensation in the interpolating frame image at the same time, and this may appropriately improve both the image quality deterioration due to the motion blur and the image quality deterioration due to the motion compensation errors.

Since the compensation intensity may be varied (weakened) in the motion compensation processing in the FRC when the moving image such as movie or game (CG) likely to include a plurality of the same consecutive images is input, the image quality deterioration due to the motion-compensated FRC process may effectively be controlled by reducing the effects of the detection errors, the motion compensation errors, etc., of the motion vector due to the discontinuity of images.

Figure 19:
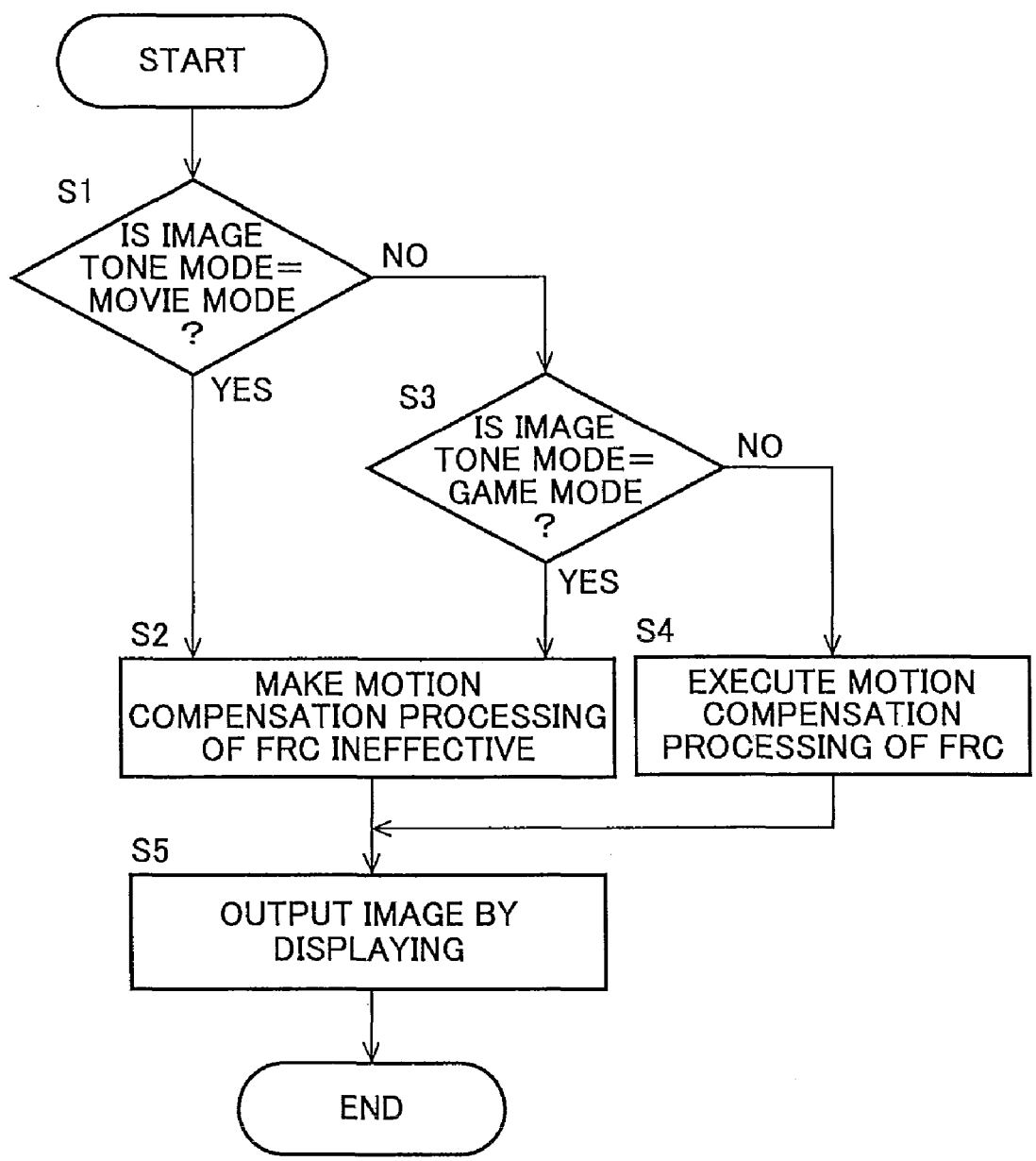
FIG. 19 is a flowchart for explaining an example of an image displaying method by the image displaying device of the present invention.

FIG. 19 is a flowchart for explaining an example of an image displaying method by the image displaying device of the present invention. An example of the image displaying method in the first embodiment will be described. First, the image displaying device determines whether the image tone mode selected by a user is "movie mode" based on a remote control signal received (step S1), and if it is determined that the image tone mode is "movie mode" (in the case of YES), the motion vector or the interpolating vector is set to zero-vector to make the motion compensation processing of the FRC portion 10 ineffective (step S2). If it is determined at step S1 that the image tone mode selected by the user is not "movie mode" (in the case of NO), it is determined whether the image tone mode selected by the user is "game mode" (step S3).

If it is determined at step S3 that the image tone mode is "game mode" (in the case of YES), the motion vector or the interpolating vector is set to zero-vector to make the motion compensation processing of the FRC portion 10 ineffective (step S2), and if it is determined that the image tone mode is not "game mode" (in the case of NO), the motion compensation processing of the FRC portion 10 is executed as usual (step S4). The image signal with the frame frequency converted in this way is displayed and output from the liquid crystal display panel 19 (step S5).

Figure 20:
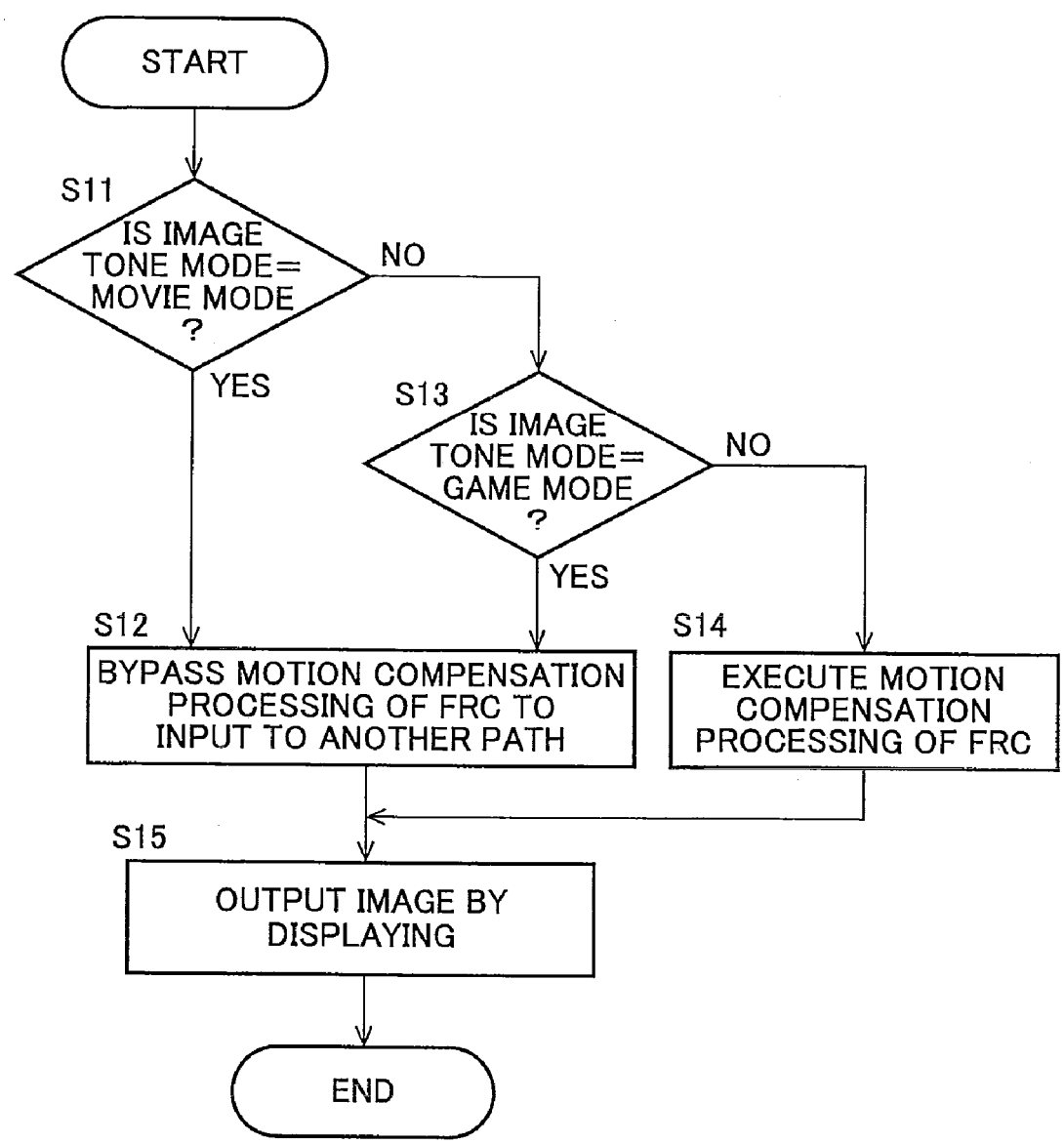
FIG. 20 is a flowchart for explaining another example of the image displaying method by the image displaying device of the present invention.

FIG. 20 is a flowchart for explaining another example of the image displaying method by the image displaying device of the present invention. An example of the image displaying method in the second to sixth embodiments will be described. First, the image displaying device determines whether the image tone mode selected by a user is "movie mode" based on a remote control signal received (step S11), and if it is determined that the image tone mode is "movie mode" (in the case of YES), the motion-compensated frame interpolation processing of the FRC portion 10 is bypassed and the input image signal is input to the other path 20 (step S12).

On the bypassing path 20, the image signal is output after the frame rate is converted by executing any one of the inter-frame interpolation of the image signal to which the linear interpolation processing has been given, the inter-frame interpolation of the image signal of the same frame, and the inter-frame interpolation of the predetermined monochromatic image signal such as a black-level signal, or the input image signal is directly output to execute processing such as changing the drive frequency of the liquid crystal display panel 19.

If it is determined at step S11 that the image tone mode selected by the user is not "movie mode" (in the case of NO), it is determined whether the image tone mode selected by the user is "game mode" (step S13). If it is determined at step S13 that the image tone mode is "game mode" (in the case of YES), the motion-compensated frame interpolation processing of the FRC portion 10 is bypassed and the input image signal is input to the other path 20 (step S12), and the image signal is output after the frame rate is converted by executing any one of the inter-frame interpolation of the image signal to which the linear interpolation processing has been given, the inter-frame interpolation of the image signal of the same frame, and the inter-frame interpolation of the predetermined monochromatic image signal such as a black-level signal, or the input image signal is directly output to execute processing such as changing the drive frequency of the liquid crystal display panel 19. If it is determined at step S13 that the image tone mode is not "game mode" (in the case of NO), the image signal is output that is given the motion-compensated interpolation processing of the FRC portion 10 (step S14). Finally, the image is displayed and output from the liquid crystal display panel 19 (step S15).

Figure 21:
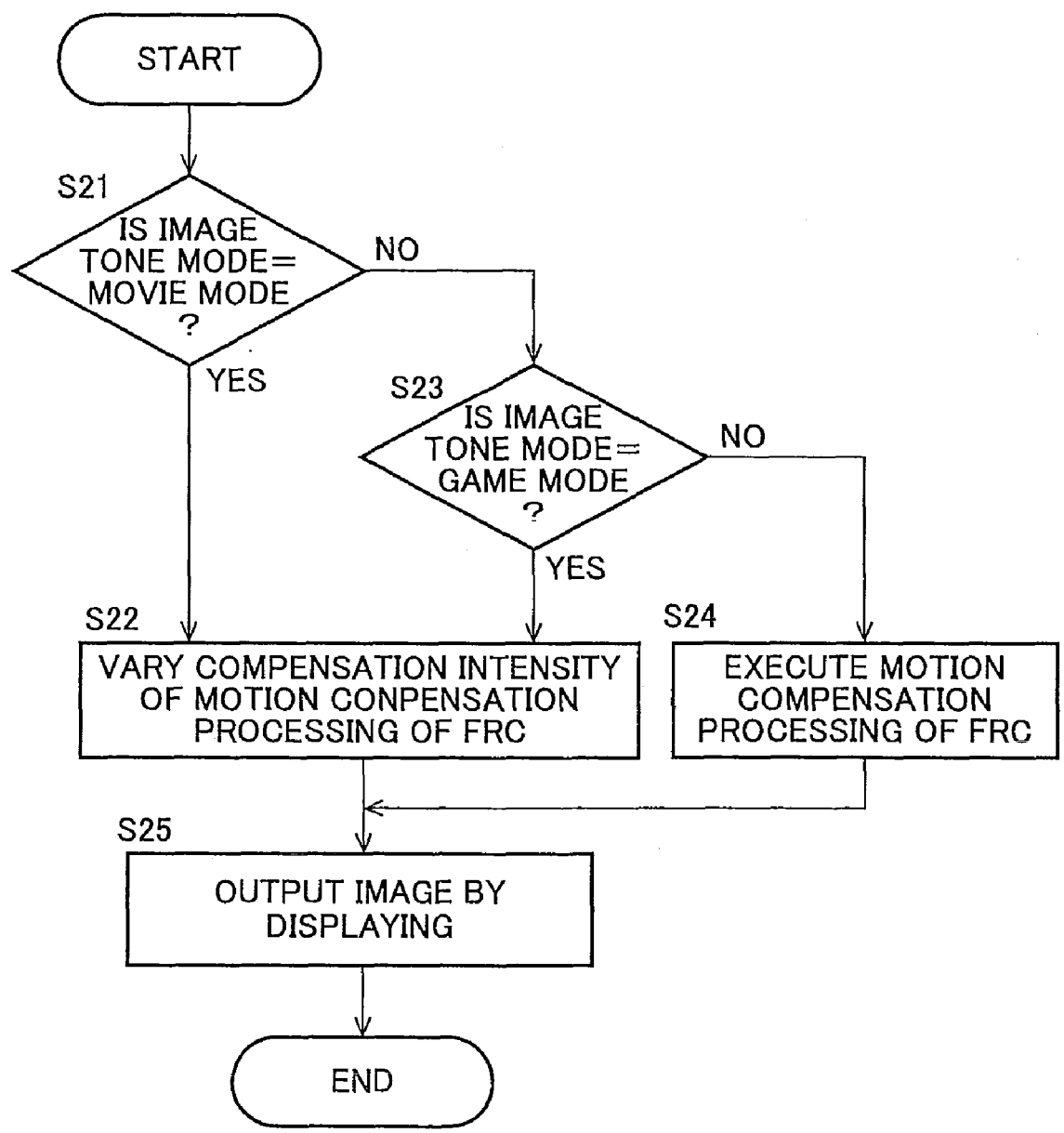
FIG. 21 is a flowchart for explaining another example of the image displaying method by the image displaying device of the present invention.

FIG. 21 is a flowchart for explaining another example of the image displaying method by the image displaying device of the present invention. An example of the image displaying method in the seventh embodiment will be described. First, the image displaying device determines whether the image tone mode selected by a user is "movie mode" based on a remote control signal received (step S21), and if it is determined that the image tone mode is "movie mode" (in the case of YES), the compensation intensity is varied (weakened) in the motion compensation processing of the FRC portion 10 (step S22). If it is determined at step S21 that the image tone mode selected by the user is not "movie mode" (in the case of NO), it is determined whether the image tone mode selected by the user is "game mode" (step S23).

If it is determined at step S23 that the image tone mode is "game mode" (in the case of YES), the compensation intensity is varied (weakened) in the motion compensation processing of the FRC portion 10 (step S22). If it is determined at step S23 that that the image tone mode is not "game mode" (in the case of NO), the compensation intensity is increased as usual in the motion compensation processing of the FRC portion 10 (step S24). The image signal with the frame frequency converted in this way is displayed and output from the liquid crystal display panel 19 (step S25).

As above, according to the present invention, when an image tone mode such as movie mode or game mode is selected, a moving image signal likely to include a plurality of the same consecutive images is highly probably input and, since displaying and outputting are performed by making the motion compensation processing in the frame rate converting (FRC) portion ineffective, the image quality may effectively be prevented from deteriorating due to the motion compensation errors. It is needless to say that the image signal is not limited to the television image signal and may be an image signal reproduced from an external medium.

In the above embodiment, the image displaying device has been described that has the four image tone modes set therein and that controls the motion compensation processing of the frame rate converting (FRC) portion when "movie mode" or "game mode" of the four modes is selected by a user. However, the image tone modes set in the image displaying device may be those other than the above modes and, in the case where, for example, a PC (Personal Computer) mode suitable for a PC video image and an animation mode suitable for an animation video image are provided, when the PC mode or the animation mode is selected, the image displaying device may control the motion compensation processing by the frame rate converting (FRC) portion.

Although the exemplary embodiments related to the image displaying device and method of the present invention have been described as above, the above description will facilitate understanding of an image displaying program operable to drive a computer to execute the image displaying method as a program and a program recording medium, which is a computer-readable recording medium having the image displaying program recorded thereon.

The invention claimed is:

1. An image displaying device having a rate converting portion that converts the number of frames or fields of an input image signal by interpolating an interpolation image signal between frames or fields of the input image signal, further comprising:
   a mode setting portion for a user to select and set an image tone mode to set and adjust the image quality of a display image from a plurality of image tone modes prepared in advance, wherein
   the rate converting portion comprises an interpolation image generating portion for generating an interpolation image signal by applying motion compensation processing to the input image signal based on motion vector information between the frames or fields of the input image signal, and
   the interpolation of the image signal generated by applying the motion compensation processing is not executed by the rate converting portion when the image tone mode set by the mode setting portion is a predetermined image tone mode set in advance as an image tone mode suitable for displaying a video image including a moving image likely to include the same consecutive images in a plurality of frames or fields.

2. The image displaying device as defined in claim 1, wherein
   the rate converting portion interpolates an image signal generated by making the motion compensation processing in the interpolation image generating portion ineffective between the frames or fields of the input image signal when the image tone mode set by the mode setting portion is the predetermined image tone mode.

3. The image displaying device as defined in claim 2, wherein the interpolation image generating portion comprises:
   a motion vector detecting portion that detects the motion vector information between consecutive frames or fields included in the input image signal; and
   an interpolating vector allocating portion that allocates an interpolating vector between the frames or fields based on the detected motion vector information.

4. The image displaying device as defined in claim 3, wherein
   the interpolation image generating portion makes the motion compensation processing ineffective by setting the motion vector detected by the motion vector detecting portion to zero-vector when the image tone mode set by the mode setting portion is the predetermined image tone mode.

5. The image displaying device as defined in claim 3, wherein
   the interpolation image generating portion makes the motion compensation processing ineffective by setting the interpolating vector allocated by the interpolating vector allocating portion to zero-vector when the image tone mode set by the mode setting portion is the predetermined image tone mode.

6. The image displaying device as defined in claim 1, which does not insert the interpolation image signal generated by applying the motion compensation processing between the frames or fields of the input image signal and does not convert the number of frames or fields of the input image signal when the image tone mode set by the mode setting portion is the predetermined image tone mode.

7. The image displaying device as defined in claim 6, wherein
   a driving frequency of a display panel displaying the image signal is variable, and
   the image displaying device comprises a portion for varying the driving frequency of the display panel from the frame frequency or the field frequency converted by the rate converting portion to the frame frequency or the field frequency of the input image signal when the image tone mode set by the mode setting portion is the predetermined image tone mode.

8. The image displaying device as defined in claim 1, wherein
   the rate converting portion converts the number of frames or fields of the input image signal by inserting an image signal to which the motion compensation processing has not been applied between the frames or fields of the input image signal when the image tone mode set by the mode setting portion is the predetermined image tone mode.

9. The image displaying device as defined in claim 8, wherein
   the rate converting portion converts the number of frames or fields of the input image signal by inserting an image signal of the frames or fields between frames or fields of the input image signal when the image tone mode set by the mode setting portion is the predetermined image tone mode.

10. The image displaying device as defined in claim 8, wherein
    the rate converting portion converts the number of frames or fields of the input image signal by interpolating an image signal formed by applying a linear interpolation processing to an image signal of the frames or fields between frames or fields of the input image signal when the image tone mode set by the mode setting portion is the predetermined image tone mode.

11. The image displaying device as defined in claim 7, wherein
the rate converting portion converts the number of frames or fields of the input image signal by inserting a predetermined monochromatic image signal between frames or fields of the input image signal when the image tone mode set by the mode setting portion is the predetermined image tone mode.

12. The image displaying device as defined in claim 1, wherein
the predetermined image tone mode is movie mode.

13. The image displaying device as defined in claim 1, wherein
the predetermined image tone mode is game mode.

14. The image displaying device as defined in claim 1, wherein the rate converting portion converts a frame frequency or field frequency of the input image signal into integral multiples of each.

15. An image displaying method having a rate converting process for converting the number of frames or fields of an input image signal by interpolating an interpolation image signal between frames or fields of the input image signal, the method further comprising:
causing a user to select and set an image tone mode to set and adjust the image quality of a display image from a plurality of image tone modes prepared in advance, wherein
the rate converting process has an interpolation image generating process for generating an interpolation image signal by applying the motion compensation processing to the input image signal based on motion vector information between frames or fields of the input image signal, and
the interpolation of the image signal generated by applying the motion compensation processing is not executed in the rate converting process when the image tone mode set by the user is a predetermined image tone mode set in advance as an image tone mode suitable for displaying a video image including a moving image likely to include the same consecutive images in a plurality of frames or fields.

16. The image displaying method as defined in claim 15, wherein
in the rate converting process, the image signal generated by making the motion compensation processing in the interpolation image generating portion ineffective is interpolated between the frames or fields of the input image signal when the image tone mode set by the mode setting portion is the predetermined image tone mode.

17. The image displaying method as defined in claim 15, wherein
the interpolation image signal generated by applying the motion compensation processing is not inserted between the frames or fields of the input image signal and the number of frames or fields of the input image signal is not converted when the image tone mode set by the user is the predetermined image tone mode.

18. The image displaying method as defined in claim 15, wherein
in the rate converting process, the number of frames or fields of the input image signal is converted by inserting an image signal of the frames or fields between frames or fields of the input image signal when the image tone mode set by the user is the predetermined image tone mode.

19. The image displaying method as defined in claim 15, wherein
in the rate converting process, the number of frames or fields of the input image signal is converted by interpolating an image signal formed by applying a linear interpolation processing to the image signal of the frames or fields between frames or fields of the input image signal when the image tone mode set by the user is the predetermined image tone mode.

20. The image displaying method as defined in claim 15, wherein
in the rate converting process, the number of frames or fields of the input image signal is converted by inserting a predetermined monochromatic image signal between the frames or fields of the input image signal when the image tone mode set by the user is the predetermined image tone mode.

21. An image displaying device having a rate converting portion that converts the number of frames or fields of an input image signal by interpolating an interpolation image signal between frames or fields of the input image signal, further comprising:
a mode setting portion for a user to select and set an image tone mode to set and adjust the image quality of a display image from a plurality of image tone modes prepared in advance, wherein
the rate converting portion comprises an interpolation image generating portion that generates an interpolation image signal by applying the motion compensation processing to the input image signal based on motion vector information between the frames or fields of the input image signal, and
interpolates an interpolation image signal generated by reducing the strength of the compensation of the motion compensation processing between frames or fields of the input image signal when the image tone mode set by the mode setting portion is a predetermined image tone mode suitable for displaying a video image including a moving image likely to include the same consecutive images in a plurality of frames or fields.

22. The image displaying device as defined in claim 21, wherein
the interpolation image generating portion generates an interpolation image signal by performing weighted addition of the image signal to which the motion compensation processing has been applied and an image signal to which the motion compensation processing has not been applied at a predetermined rate, and
the rate of the weighted addition is varied when the genre determined by the determining portion is the predetermined genre.

23. The image displaying device as defined in claim 22, wherein the interpolation image generating portion defines the image signal to which the motion compensation processing has not been applied as the interpolation image signal when the image tone mode set by the mode setting portion is the predetermined image tone mode, and
defines the image signal to which the motion compensation processing has been applied as the interpolation image signal when the image tone mode set by the mode setting portion is not the predetermined image tone mode.

24. The image displaying device as defined in claim 22, wherein
the interpolation image generating portion uses an image signal to which a linear interpolation processing has been applied between the frames or fields of the input image signal as the image signal to which the motion compensation processing has not been applied.

25. The image displaying device as defined in claim 21, wherein
the predetermined image tone mode is movie mode.

26. The image displaying device as defined in claim 21, wherein
the predetermined image tone mode is game mode.

27. An image displaying method having a rate converting process for converting the number of frames or fields of an input image signal by interpolating an interpolation image signal between frames or fields of the input image signal, the method further comprising:

causing a user to select and set an image tone mode to set and adjust the image quality of a display image from a plurality of image tone modes prepared in advance, wherein the rate converting process has an interpolation image generating process for generating an interpolation image signal by applying the motion compensation processing to the input image signal based on motion vector information between frames or fields of the input image signal, and the interpolation image signal generated by reducing the strength of the compensation of the motion compensation processing is interpolated between the frames or fields of the input image signal when the image tone mode set by the user is a predetermined image tone mode set in advance as an image tone mode suitable for displaying a video image including a moving image likely to include the same consecutive images in a plurality of frames or fields.

\* \* \* \* \*